United States Patent [19]

Kawanishi et al.

[11] Patent Number: 5,430,451
[45] Date of Patent: Jul. 4, 1995

[54] ARRAY ANTENNA MOUNTED ON SPACECRAFTS

[75] Inventors: Toneo Kawanishi, Tokyo; Yasuo Tamai, Tsukuba; Yoshihiko Konishi, Kamakura; Shin-ichi Satoh, Kamakura; Takashi Katagi, Kamakura, all of Japan

[73] Assignees: National Space Development Agency of Japan; Mitsubishi Denki Kabushiki Kaisha, both of Tokyo, Japan

[21] Appl. No.: 117,240

[22] Filed: Sep. 7, 1993

[30] Foreign Application Priority Data

Sep. 8, 1992 [JP] Japan ................................ 4-239435

[51] Int. Cl.[6] ...................... H01Q 15/20; H04B 7/185
[52] U.S. Cl. .................................... 342/354; 343/915; 343/DIG. 2
[58] Field of Search .......... 343/915, DIG. 2, 700 MS, 343/884; 342/372, 354

[56] References Cited

U.S. PATENT DOCUMENTS

| | | | |
|---|---|---|---|
| 3,569,875 | 3/1971 | Paine | 333/96 |
| 4,380,013 | 4/1983 | Slysh | 343/753 |
| 4,686,533 | 8/1987 | MacDonald et al. | 342/373 |
| 5,017,925 | 5/1991 | Bertiger et al. | 342/352 |
| 5,047,788 | 9/1991 | Gillard | 343/915 |
| 5,200,758 | 4/1993 | Gillard | 343/880 |
| 5,247,309 | 9/1993 | Reich | 342/368 |

FOREIGN PATENT DOCUMENTS

0421722 4/1991 European Pat. Off.

OTHER PUBLICATIONS

Nemoto, et al "Japanese Eaerth Resources Satellite-1 Synthetic Aperture Radar" Proceedings of the IEEE Jun. 1991.
R. Raney, et al "Radarsat" Proceedings of the IEEE Jun. 1991.
Y. Hwang "Satellite Antennas" Proceedings of the IEEE Jan. 1992.
E. Ramos, et al "A Multiple Access Payload for Data Relay Applications Using Separate Transmit/Reaceive Active Arrays" May 1990.

Primary Examiner—Thomas H. Tarcza
Assistant Examiner—Dao L. Phan
Attorney, Agent, or Firm—Wolf, Greenfield & Sacks

[57] ABSTRACT

An array antenna mounted on a spacecraft in its stowed state. After the spacecraft is launched in a predetermined position or on a predetermined orbit, the array antenna is extended to a flat plate form or a curved surface form. The array antenna has a structure that a plurality of subarrays are connected by plate springs or the like. The array antenna is extended in a kite form by using cables for connecting a spacecraft body and the subarrays or is extended by using an extension pole mounted on the spacecraft body. Each subarray includes a variable phase shifter to switch a shape and a direction of a directivity beam. A feeder line, a power supply line, a control signal line and the like connect the spacecraft body and each subarray.

56 Claims, 17 Drawing Sheets

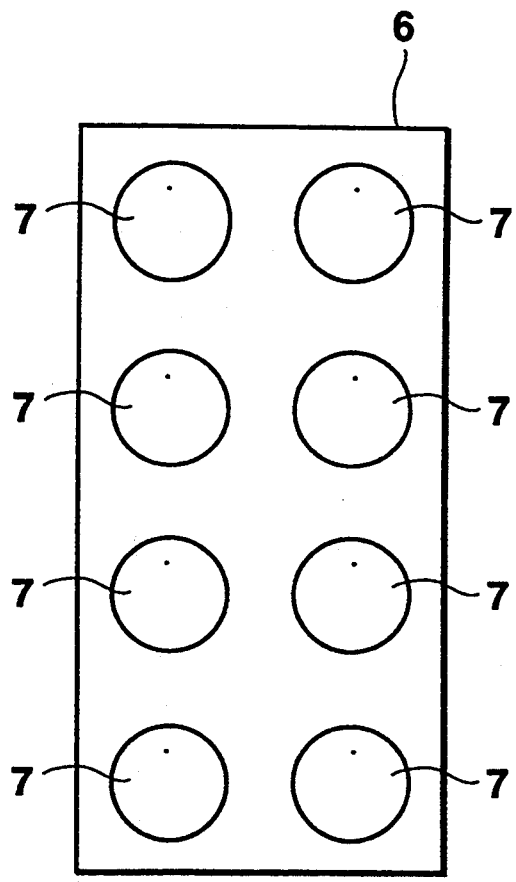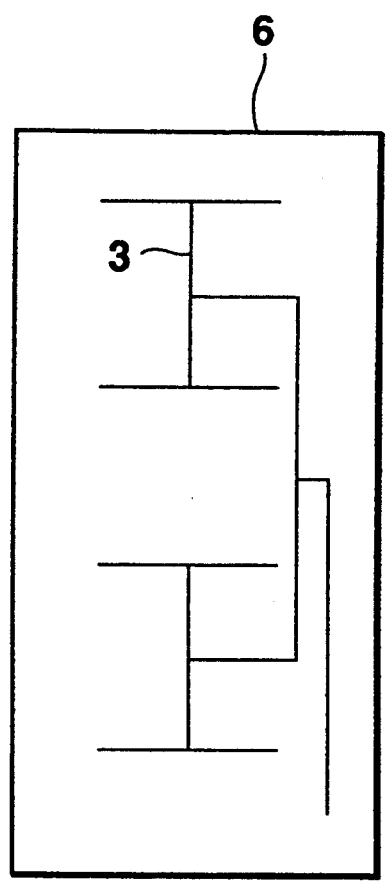
Fig. 15A
PRIOR ART
Fig. 15B
PRIOR ART

ARRAY ANTENNA MOUNTED ON SPACECRAFTS

BACKGROUND OF THE INVENTION i) Field of the Invention

The present invention relates to an array antenna mounted on spacecrafts.

ii) Description of the Related Arts

Conventionally, for a satellite communication, a radio wave research or the like, an array antenna is used by mounting on a spacecraft or an artificial satellite. For example, in "Japanese Earth Resources Satellite-1 Synthetic Aperture Radar", Nemoto et al., Proceedings of the IEEE, Vol. 79, No. 6, pp. 800-809. June, 1991, an array antenna mounted on spacecrafts is disclosed, as shown in FIGS. 14 to 17.

In FIG. 14, there is shown an arrangement of electrodes on the back of an extended array antenna 9. In the drawing, 8 (in general, a plurality number of) subarrays 1 each have a flat plate form. In this case, the 8 subarrays 1 aligned in the transverse direction are successively connected with one another via joint parts 2. In such a connection structure, the array antenna 9 can be stowed, as shown in FIG. 17A, and be extended, as shown in FIG. 17C.

Each subarray 1 is provided with a subarray feeder 3. The subarray feeder 3 is formed, as shown in an enlarged scale in FIG. 15B. In FIG. 15B, the subarray feeder 3 is formed on the back of a support 6 in a pattern so as to feed to antenna elements 7 mounted on the surface of the support 6. In this conventional case, as shown in FIG. 15A, 8 antenna elements 7 are provided for each subarray 1.

Each subarray feeder 3 is connected to an intersubarray feeder 4 and the intersubarray feeder 4 is coupled with an RF (radio frequency) signal feeding cable 5. As a result, a circuit construction shown in FIG. 16 can be obtained. As shown in FIG. 16, a signal output from a transmitter 10 within a spacecraft body 8 is fed to each subarray feeder 3 via the RF signal feeding cable 5 and the intersubarray feeder 4. A feeding amplitude and a phase can be adjusted in the intersubarray feeder 4 and each subarray feeder 3. From each antenna element 7, a radio frequency signal is irradiated depending on the feeding. In this case, when the array antenna 9 is used for receiving a signal, the transmitter 10 is replaced with a receiver.

In the array antenna 9 having the connection structure shown in FIG. 14, mounted on the spacecraft, the array antenna 9 is stowed in a position along the surface of the spacecraft body 8 when the spacecrafts is launched. After the launching, the array antenna 9 is rotated 90 degrees in an outer space, as shown in FIG. 17A. From this state, by functioning the joint parts 2, the array antenna 9 is extended to the left and right hand sides from a center arm 11, as shown in FIG. 17B, to become the flat plate form, as shown in FIG. 17C. The center arm 11 has a function for supporting the array antenna 9 on the spacecraft body 8.

While the array antenna 9 is extended, the attitude of the spacecraft body 8 is adjusted or the attitude (angle) of the array antenna 9 with respect to the array antenna 9 is adjusted so as to direct a directivity beam of the array antenna 9 to the desired direction. Further, the shape of this beam can be determined by adjusting the feeding amplitude and the phase for each subarray 1 (more specifically, the antenna elements 7).

However, the control of the direction and the shape of the directivity beam can be carried out only when the array antenna 9 is completely extended in the flat plate form. Also, the extended state in the flat plate form of the array antenna 9 must be continuously maintained in the outer space beyond the reach of hands. Hence, the coupling between the subarrays 1 by the joint parts 2 must be very much strong. As a result, the volume of the joint parts 2 becomes large and the weight of the same also becomes heavy. Further, when the flat plate form of the subarrays 1 or the array antenna 9 is changed or deformed due to the secular change, the direction and the shape of the beam are shifted from the initials. However, since the array antenna 9 is mounted on the spacecraft beyond the reach of the human's hands, it is quite difficult to correct the shifts.

Further, it is necessary to change the attitude of the spacecraft body 8 or the attitude (angle) of the array antenna 9 with respect to the spacecraft body 8. This restricts the degree of freedom of the attitude of the spacecraft body 8.

SUMMARY OF THE INVENTION

Accordingly, it is a first object of the present invention to provide an array antenna in view of the above-described problems of the prior art, which is capable of determining a direction of a directivity beam of the array antenna to a predetermined direction without using joint parts for coupling subarrays with a large strength.

It is another object of the present invention to provide an array antenna which is capable of changing a direction of a directivity beam of the array antenna without changing the direction of the array antenna.

An array antenna according to the present invention is mounted on a spacecraft, has a stowed state before launching of the spacecraft, includes a plurality of subarrays, and comprises:
 a) a joint mechanism for jointing the subarrays;
 b) connection means for electrically connecting each subarray to the spacecraft;
 c) an electric circuit for selecting one of a shape and a direction of a directivity beam;
 d) a support mechanism for supporting each subarray onto the spacecraft; and
 e) an antenna extension mechanism for extending the array antenna to a predetermined form after launching the spacecraft.

A spacecraft according to the present invention comprises:
 a) a spacecraft body; and
 b) an array antenna to be mounted on the spacecraft body, the array antenna having a stowed state before launching the spacecraft and including a plurality of subarrays,
  b1) the array antenna including:
  b2) a joint mechanism for jointing the subarrays;
  b3) connection means for electrically connecting each subarray to the spacecraft;
  b4) an electric circuit for selecting one of a shape and a direction of a directivity beam;
  b5) a support mechanism for supporting each subarray onto the spacecraft; and
  b6) an antenna extension mechanism for extending the array antenna to a predetermined form after launching the spacecraft.

According to the present invention, before launching the spacecraft, the array antenna is in the stowed state.

When the spacecraft is launched and is placed in the predetermined position or on the predetermined orbit, the antenna extension mechanism extends the array antenna to the predetermined form. The array antenna has the construction that a plurality of subarrays are connected by the joint mechanism. Also, the array antenna is supported on the spacecraft by the support mechanism and is electrically connected to the spacecraft by the connection means.

In the present invention, further, the electric circuit for selecting one of the shape and the direction of the directivity beam is provided. This electric circuit can be mounted on the spacecraft body or on each subarray. This electric circuit, for example, includes a variable phase shifter. Hence, by the operation of this electric circuit, the shape and/or the direction of the directivity beam can be changed without changing the direction of the array antenna. This is linked with an improvement of the degree of freedom of the spacecraft.

Also, when the array antenna is not extended to the predetermined form (for example, the flat surface, the curved surface or the like), when an unevenness is caused on the subarray by a secular change or the like, or when an attitude change of the subarray is caused, such a function is useful for compensating these problems by the operation of the electric circuit to realize the directivity beam having the desired shape and/or the direction. Hence, according to the present invention, the construction of the joint mechanism for jointing the subarrays can be simplified and made to a light weight and a low cost. More specifically, the joint mechanism can be realized by a plurality of plate springs for connecting the adjacent subarrays.

As to the extension situation of the array antenna, first, a kite form extension is given. That is, a plurality of connection cables as the support mechanism for supporting the subarrays onto the spacecraft are used to connect the subarrays onto the spacecraft in the kite form when the array antenna is extended.

When this situation is adopted, each connection cable can be allowed to have a plurality of functions. That is, in addition to the supporting function of each subarray onto the spacecraft, an electrically connecting function (the function of the above-described connection means) of each subarray to the spacecraft can be given to each cable.

Of these functions, the supporting function, for example, can be realized by including a subarray support wire for ensuring a connection strength between the corresponding subarray and the spacecraft into each connection cable. Also, the electrically connecting function can be a different construction depending on the construction of the subarray and can be constructed by a single line or a plurality of lines. For example, this electrically connecting function can be realized by a feeder line for feeding to the corresponding subarray (or its variable phase shifter), a control signal line for transmitting a control signal for controlling the operation of the corresponding variable phase shifter, and a power supply line for supplying an electric power to the corresponding variable phase shifter and the like. The feeder line, the control signal line and the power supply line can be included in each connection cable.

Concerning the feeder line, an electric signal line can be used and in place of this or together with this, an optical fiber can be used. This optical fiber can be provided between the spacecraft and each subarray, for example, within each connection cable. When a radio frequency signal (a signal to be transmitted from the array antenna) is transmitted from the spacecraft toward each subarray, first, the radio frequency signal is generated by a circuit of a transmitter or the like mounted on the spacecraft, and this signal is converted into an optical signal on the spacecraft. This optical signal is transmitted to each subarray via the optical fiber. In each subarray, the optical signal transmitted via the optical fiber is reversely converted into the electric signal. This electric signal is used for transmitting in each subarray. When each subarray includes a plurality of antenna elements, this signal is supplied to the antenna elements by using the variable phase shifter or the like. On the other hand, when a radio frequency signal (a signal received by the array antenna) is transmitted from each subarray to the spacecraft, the signal received by the antenna element is used for an electrooptic transducer via the variable phase shifter and the obtained optical signal passes the optical fiber and is used for an optoelectric transducer on the spacecraft to input to a receiver and the like. Hence, suitable transmission and reception quality of the radio frequency signal can be obtained.

The signal transmission by the optical fiber can be utilized for the control signal transmission against the variable phase shifter. That is, when the radio frequency signal is transmitted from the spacecraft to each subarray, this radio frequency signal is multiplexed with the control signal, and the obtained signal can be separated into the original signal components in each subarray. In this manner, the control signal for the variable phase shifter can be transmitted in the form of the optical signal. Hence, suitable control signal quality can be obtained. Also, this is connected to a light weight of the connection cable.

The power supply line can be omitted by using a radio transmission. In ease of the radio transmission, an antenna for transmission and a rectenna for reception are used. The antenna for transmission transmits the electric power in the form of the radio frequency signal toward each subarray from the spacecraft. The rectenna for reception converts the electric power transmitted from the antenna for transmission from the radio frequency signal form to a direct current voltage form to supply the direct current voltage to the electric circuit of the variable phase shifter and the like. Accordingly, there is no need to provide the power supply line and thus the light weight of the spacecraft can be realized.

As to the extension situation of the array antenna, secondly, the extension by a extension pole is given. When this extension situation is employed, at least one point of the array antenna is previously mounted onto the spacecraft. Onto the spacecraft, further, the extension pole is mounted. The extension pole stretches to a predetermined direction after launching the spacecraft to extend the array antenna to the predetermined form. When the array antenna is folded into both side directions of a rectangular form of the array antenna before launching the spacecraft, the extension of the array antenna in this situation can be properly realized.

In this situation, the connection cable, the feeder line, the control signal line, the power supply line, the optical fiber transmission and the like described above can be used, but the supporting wire is not required. This is because that the array antenna is mounted onto the spacecraft.

The array antenna of the present invention can be constructed by a plurality of subarrays having a plurality of antenna elements and a Feeder path for feeding to the antenna elements. For example, the antenna elements are arranged on the surface of a support and the feeder path is arranged on the back of the support. As to the construction of the antenna elements, any of the conventional known various constructions can be used. In such a construction, the variable phase shifter can be arranged on the feeder path of each subarray, but the present invention can not be restricted to such an arrangement.

Also, the array antenna of the present invention can be used in common for the transmission and the reception. In this case, it is necessary to provide a means for switching transmission and reception functions of each subarray. This switching means can be constructed by using an element such as a circulator, diplexer or the like. That is, by using the circulator, a circuit can be constructed, in which a signal to be transmitted is supplied from the spacecraft (for example, the variable phase shifter on the subarray) to the antenna element via a first amplifier and a signal received is supplied from the antenna element to, for example, the variable phase shifter on the subarray via a second amplifier. In this case, for example, the first amplifier is a power amplifier and the second amplifier is a low noise amplifier. By this circuit, the use of the transmission and reception in common can be realized.

When the variable phase shifter as means for changing the shape and/or the direction of the directivity beam is mounted on each subarray, the attitude change of the subarray can be compensated by the phase control against the variable phase shifter. That is, the attitude change of each subarray is detected in some form and the control signal is generated depending on the detected attitude change. Then, by using the generated control signal, the variable phase shifter can be controlled.

Relating to a detection method of the attitude change, for example, a vibration sensor can be used. That is, the vibration sensor is mounted on each subarray and by this vibration sensor, the vibration of the subarray is detected. Then, on the basis of the detection result, the control signal is supplied to the variable phase shifter. Alternatively, a method using a phase change detection of a reference signal can be used. That is, the reference signal having a predetermined phase is transmitted from the spacecraft, a ground station, another spacecraft or the like. In each subarray, this reference signal is received and the phase change of the received reference signal is detected. Then, on the basis of the detection result, the control signal is supplied to the variable phase shifter. By such a method, with the attitude change, an adjustment of directivity can be suitably executed at a real time. In particular, in the latter method, the functions of the antenna elements and the like of the subarray can be readily inspected.

BRIEF DESCRIPTION OF THE DRAWINGS

The objects, features and advantages of the present invention will become more apparent from the consideration of the following detailed description, taken in conjunction with the accompanying drawings, in which:

FIG. 15A is a plan view showing an arrangement of antenna elements on the surface of a subarray of the array antenna shown in FIG. 14 and FIG. 15B is a plan view of an arrangement of a feeding system on the back of the subarray of the same;

DESCRIPTION OF THE PREFERRED EMBODIMENTS

Figure 1:
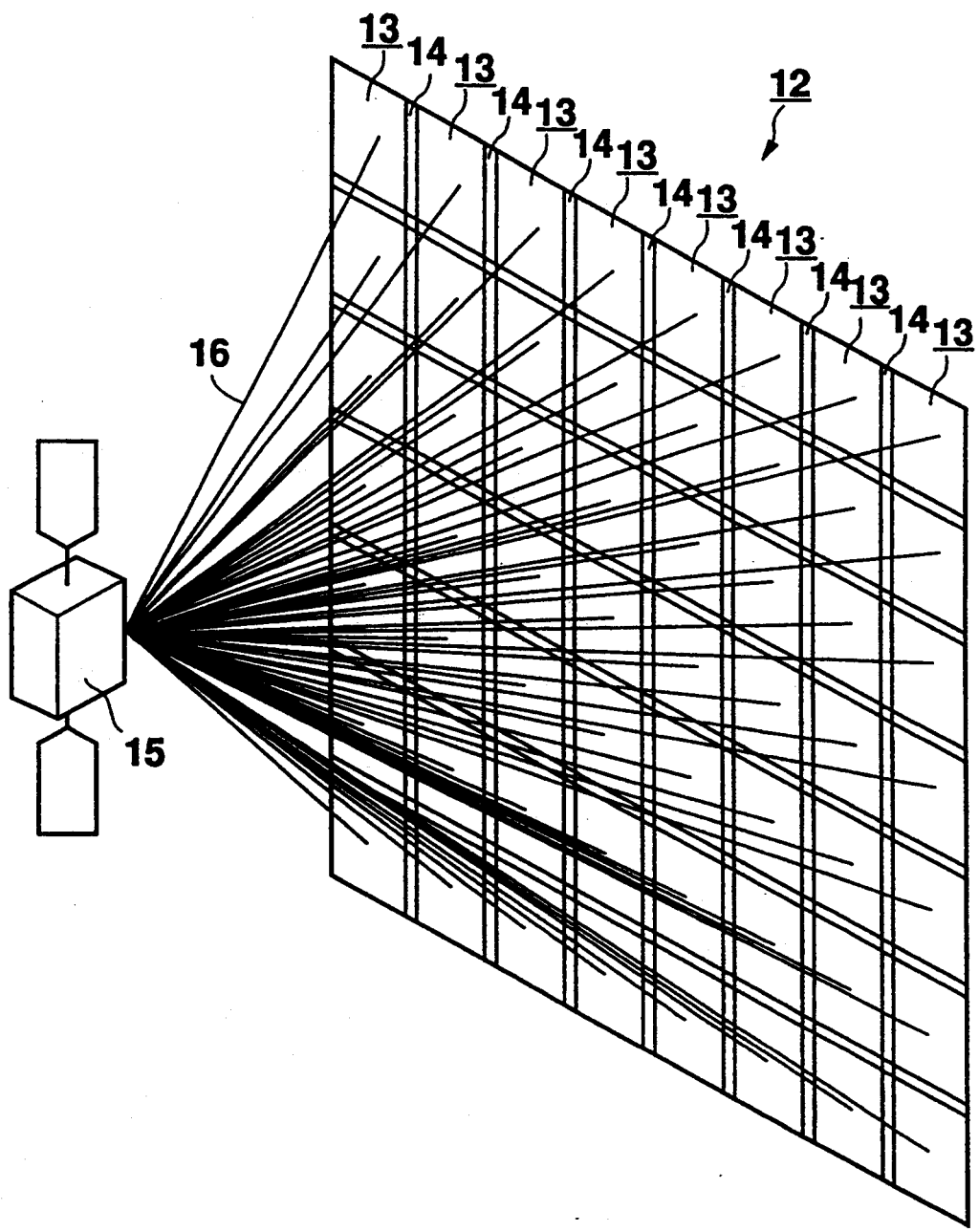
FIG. 1 is a perspective view showing an extended state of a first embodiment of an array antenna according to the present invention.

The present invention will now be described in connection with its preferred embodiments with reference to the attached drawings, wherein like reference characters designate like or corresponding parts throughout the views and thus the repeated description thereof can be omitted for brevity.

The First Embodiment

Figure 2A:
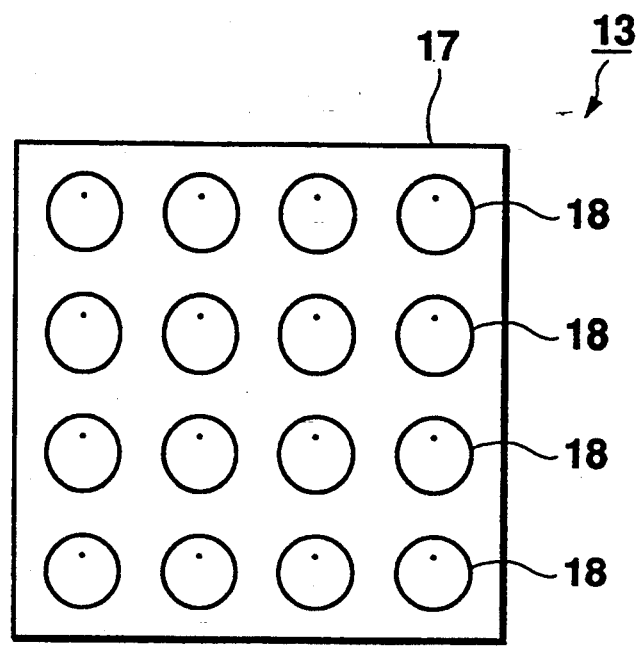
FIG. 2A is a plan view showing an arrangement of antenna elements on the surface of a subarray of the array antenna shown in FIG. 1
Figure 2B:
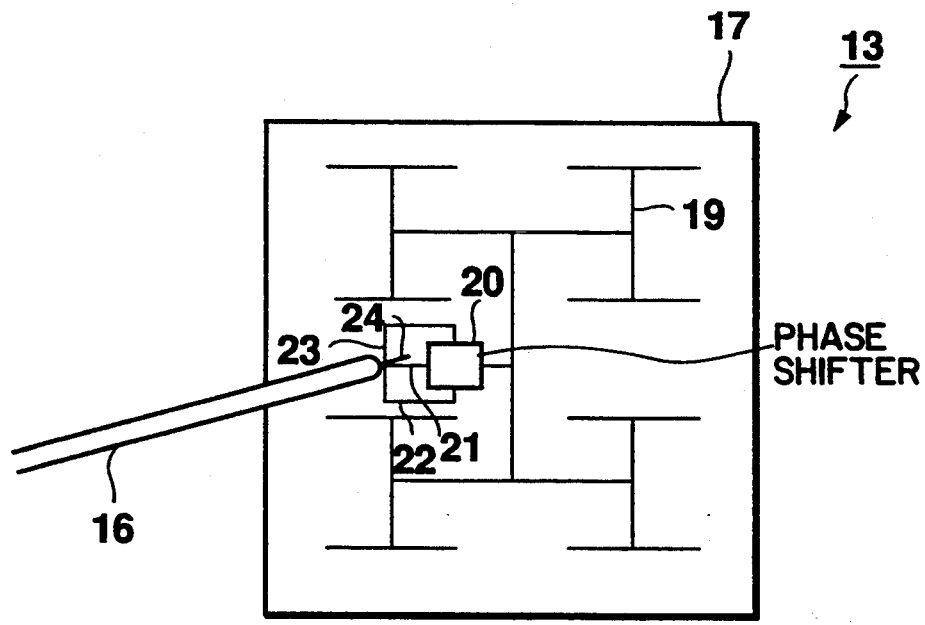
FIG. 2B is a plan view of an arrangement of a feeding system on the back of the subarray of the same.
Figure 3:
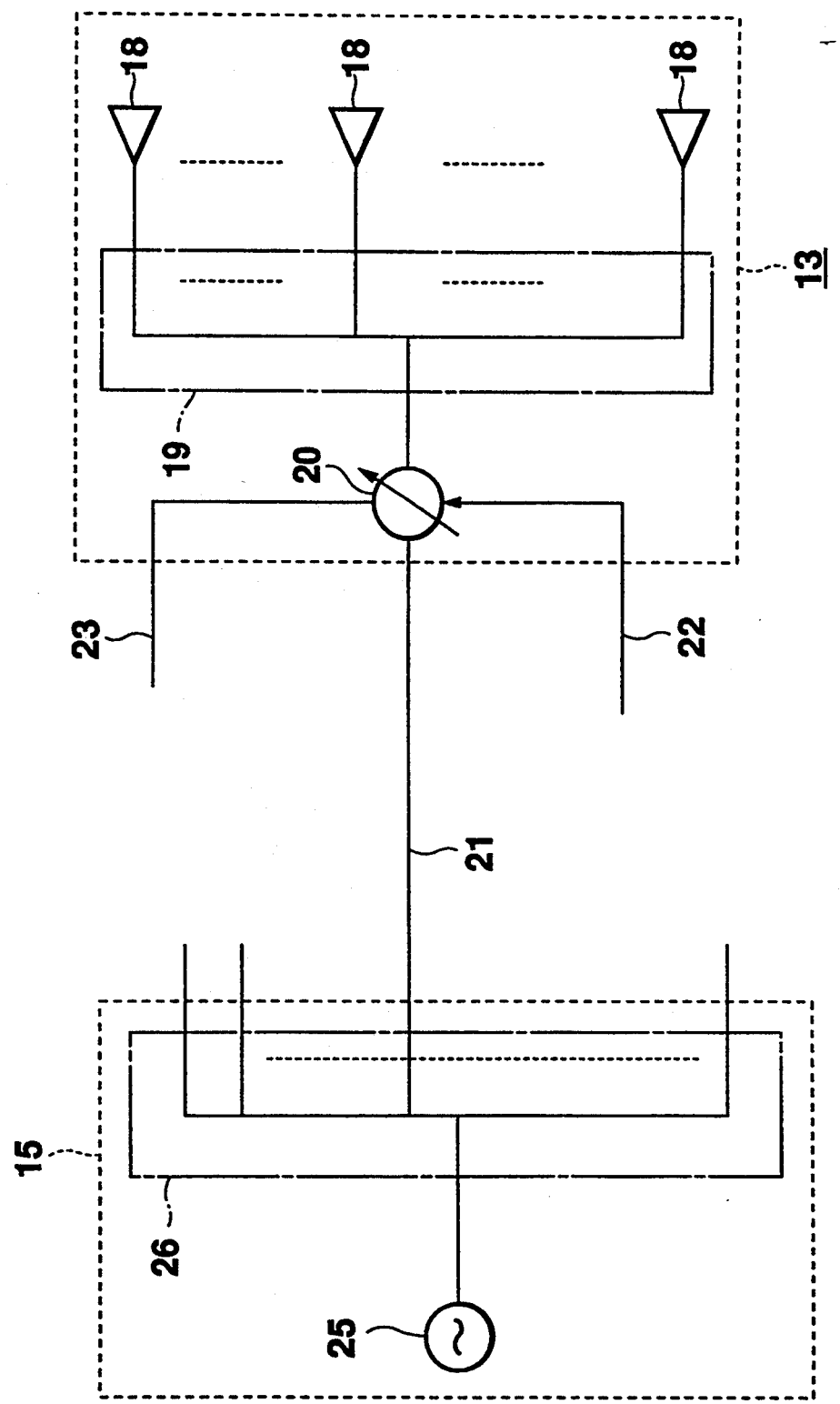
FIG. 3 is a circuit diagram of a circuit structure of the feeding system of the array antenna shown in FIG. 1.

In FIG. 1 to 3, there is shown the first embodiment of an array antenna according to the present invention. In particular, FIG. 1 illustrates the extended state of the array antenna, FIG. 2A illustrates the surface of each subarray of the array antenna, FIG. 2B illustrates the back of each subarray, and FIG. 3 illustrates a circuit of the array antenna.

First, as shown in FIG. 1, the array antenna 12 is comprised of 7×8 number (generally, a plurality number) of subarrays 13, a plurality of joint parts 14 for coupling the adjacent subarrays 13, and a plurality of cables 16 for supporting the subarrays 13 onto a spacecraft body 15 and feeding to the subarrays 13.

As shown in FIGS. 2A, 2B and 3, each subarray 13 is comprised of a support 17, antenna elements 18, a subarray feeder 19 and a phase shifter 20. As clearly shown in FIG. 2A, 4×4 number (generally, a plurality number) of antenna elements 18 are arranged in a matrix form on the surface of the support 17. As shown in FIG. 2B, the subarray feeder 19 is formed on the back of the support 17 so as to feed to the antenna elements 18. The phase shifter 20 is also mounted on the back of the support 17.

As shown in FIGS. 2B and 3, each cable 16 is constituted by a bundle of an RF (radio frequency) signal feeding cable 21, a control signal wire 22, a power supply cable 23 and a subarray support wire 24. Of these, the subarray support wire 24 is used for mechanically supporting each cable 16. The RF signal feeding cable 21 supplies the radio frequency signal to the subarray feeder 19 via the phase shifter 20, and the control signal wire 22 supplies a control signal for controlling a phase shift operation (on/off) of the phase shifter 20 or a phase shift amount to the phase shifter 20. Hence, the phase shifter 20 is controlled by the control signal supplied via the control signal wire 22 and simultaneously shifts the phase of the radio frequency signal supplied via the RF signal feeding cable 21 to supply the phase-shifted radio frequency signal to the antenna elements 18 via the subarray feeder 19. In case of receiving, on the contrary, the radio frequency signals received by the antenna elements 18 are input to the phase shifter 20 via the subarray feeder 19 and the phase shifter 20 shifts the phases of the radio frequency signals under the control of the control signal supplied via the control signal wire 22 to output the phase-shifted radio frequency signals to the RF signal feeding cable 21. The power supply cable 23 supplies the electric power to active elements constituting the phase shifter 20.

For example, as shown in FIG. 3, on the spacecraft body 15, a transmitter 25 and an intersubarray feeder 26 are mounted. The radio frequency signal output from the transmitter 25 is fed to the subarrays 13 via the RF signal feeding cables 21 by the intersubarray feeder 26. In case of the receiving, a receiver (not shown) is mounted on the spacecraft body 15 in place of the transmitter 25, and the signals are input from the subarrays 13 to the receiver via the RF signal feeding cables 21 and the intersubarray feeder 26. Of course, both the transmitter and the receiver can be mounted on the spacecraft body 15 and the array antenna 12 is used in common for both the transmission and the reception.

In this embodiment, the array antenna 12 is used in the form of just like a kite. That is, when the spacecraft is launched, the array antenna 12 is mounted on the external wall of the spacecraft body 15 or contained within the spacecraft body 15 in the stowed state. After the launching of the spacecraft, at the time point when the spacecraft is placed in a predetermined position or on a predetermined orbit in the outer space, the array antenna 12 is released from the spacecraft body 15 and the joint parts 14 are operated at the same time. Since the joint parts 14 are composed of a spring material such as a plate spring or the like, at the same time of the release of the array antenna 12, the array antenna 12 expands. When the joint parts 14 are completely extended, the array antenna 12 is supported by the cables 16 like the kite, as shown in FIG. 1. Between the subarrays 13 and the spacecraft body 15, the RF signal feeding cable 21, the control signal wire 22 and the power supply cable 23 within each cable 16 connect for supplying the radio frequency signal, the control signal and the electric power.

As described above, in this embodiment, by the phase shifter 20 mounted on each subarray 13, the radio frequency signal relating to each subarray 13 is phase-shifted. Thus, the phase shifter 20 of each subarray 13 is controlled by the control signal via the control signal wire 22 and the direction and the shape of the directivity beam of the array antenna 12 can be controlled to the desired direction and shape. Hence, even when the array antenna 12 is not completely extended or an unevenness is caused on the subarray 13, the control signal for dealing with these situations is sent out on each control signal wire 22 and thus the directivity beam can be realized in the same manner as the case that the array antenna 12 is completely extended.

Also, the joint parts 14 for coupling the adjacent subarrays 13 does not require a high connection strength. That is, if a situation that the array antenna 12 is not completely flat is caused due to insufficient connection strength, this can be compensated by the above-described phase shifter control.

Further, in this embodiment, the direction of the directivity beam of the array antenna 12 can be controlled to the desired direction by the aforementioned phase shifter control without changing the attitude of the spacecraft body 15 or the like. Of course, the present invention can be also applied to artificial satellites.

The Second Embodiment

Figure 4:
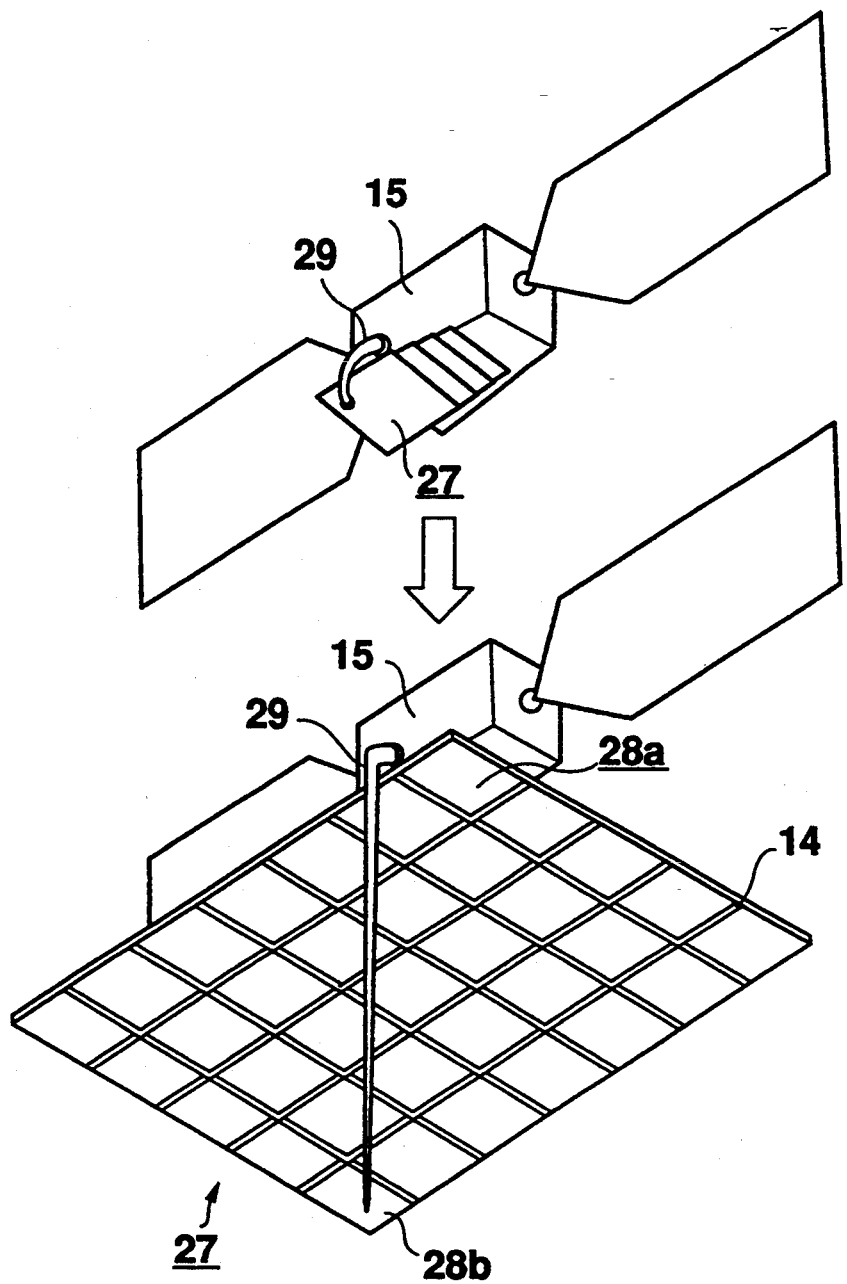
FIG. 4 is a perspective view showing an extended state of a second embodiment of an array antenna according to the present invention.
Figure 5A:
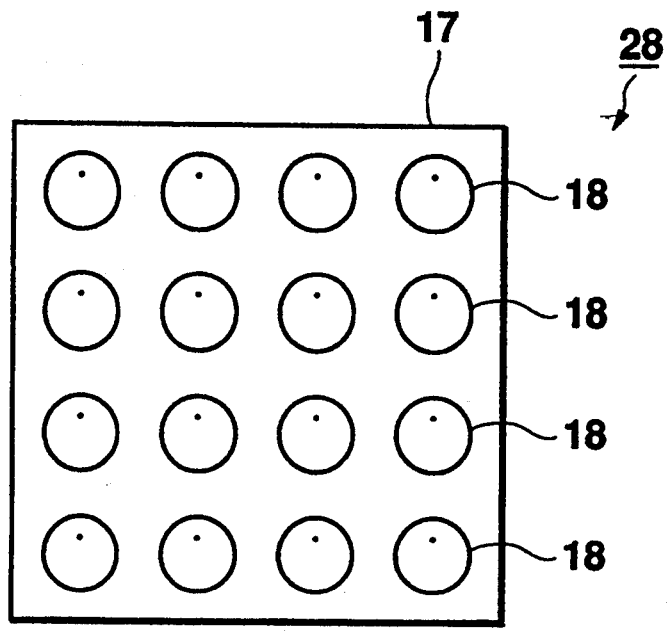
FIG. 5A is a plan view showing an arrangement of antenna elements on the surface of a subarray of the array antenna shown in FIG. 4
Figure 5B:
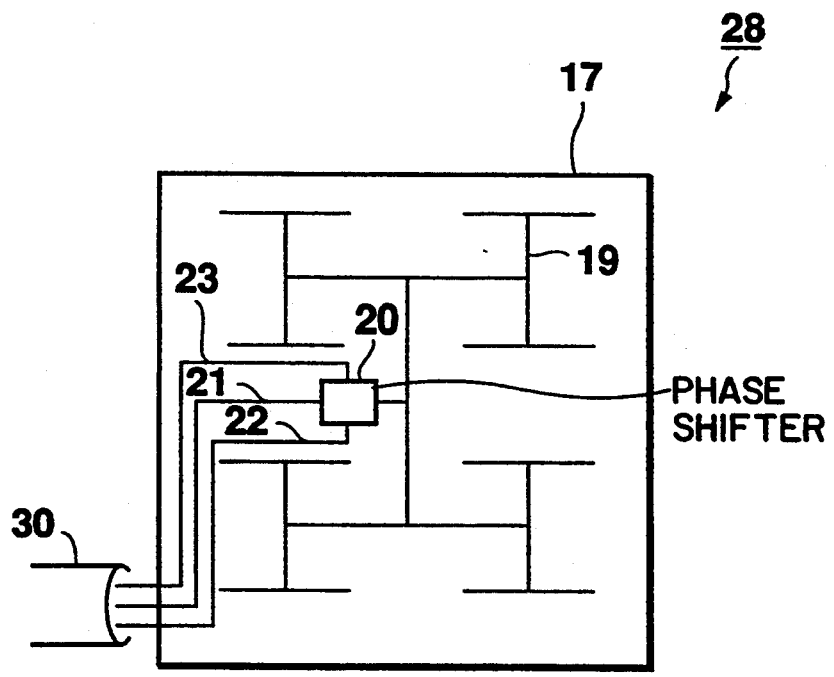
FIG. 5B is a plan view of an arrangement of a Feeding system on the back of the subarray of the same.

In FIGS. 4, 5A and 5B, there is shown the second embodiment of an array antenna according to the present invention. In particular, FIG. 4 illustrates the extended state of the array antenna, FIG. 5A illustrates the surface of each subarray of the array antenna, and FIG. 5B illustrates the back of each subarray.

In this embodiment, the extending method and the structure of the array antenna 27 is largely different from the first embodiment shown in FIG. 1. Also, with this, a difference is caused in the structure of each subarray 28.

In this case, the array antenna 27 having a rectangular form is folded, for example, into a so-called "mitsu-ura folding" or into both side directions of the rectangle before the extension. The array antenna 27 includes 5×7=35 number (generally, a plurality number) of subarrays 28. In this case, a part of the folded array antenna 27, that is, one subarray 28a positioned in one corner of the rectangle is supported onto the spacecraft body 15. The folded array antenna 27 is extended by an extension pole 29 mounted to the spacecraft body 15, as shown in FIG. 4. That is, when the folded array antenna 27 is extended, the extension pole 29 is stretched in a predetermined direction, for example, in the direction to another subarray 28b positioned along a diagonal line and in the opposite end to the subarray 28a to extend the folded array antenna 27 to the flat plate form. In this embodiment having the above-described structure, the same effects as those of the first embodiment described above can be obtained.

Further, in this embodiment, the RF signal feeding cable 21, the control signal wire 22 and the power supply cable 23 are bundled to constitute a cable 30 for connecting the circuit (for example, the transmitter 25) within the spacecraft body 15 with each subarray 28. In this case, since it is unnecessary to allow the cable 30 to have the function for mechanically supporting the subarray 28, the subarray support wire 24 in the first embodiment is not required, as shown in FIG. 5B.

The Third Embodiment

Figure 6A:
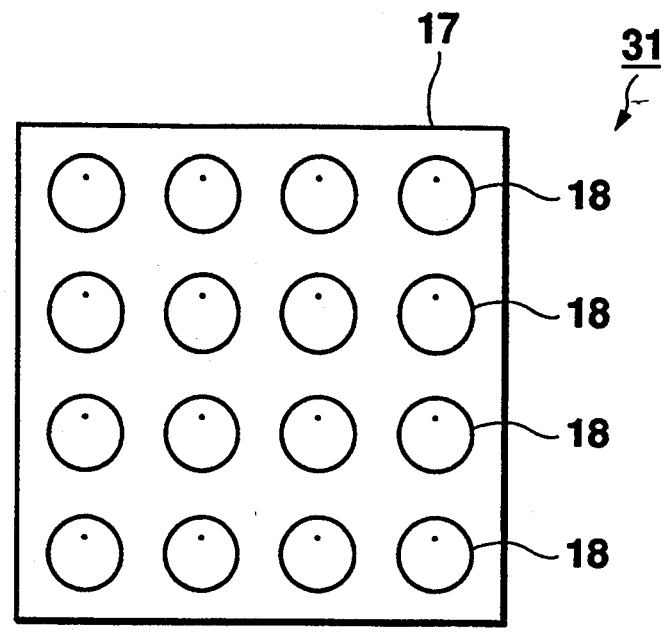
FIG. 6A is a plan view showing an arrangement of antenna elements on the surface of a subarray of a third embodiment of an array antenna according to the present invention and FIG. 6B is a plan view of an arrangement of a feeding system on the back of the subarray of the same.
Figure 6B:
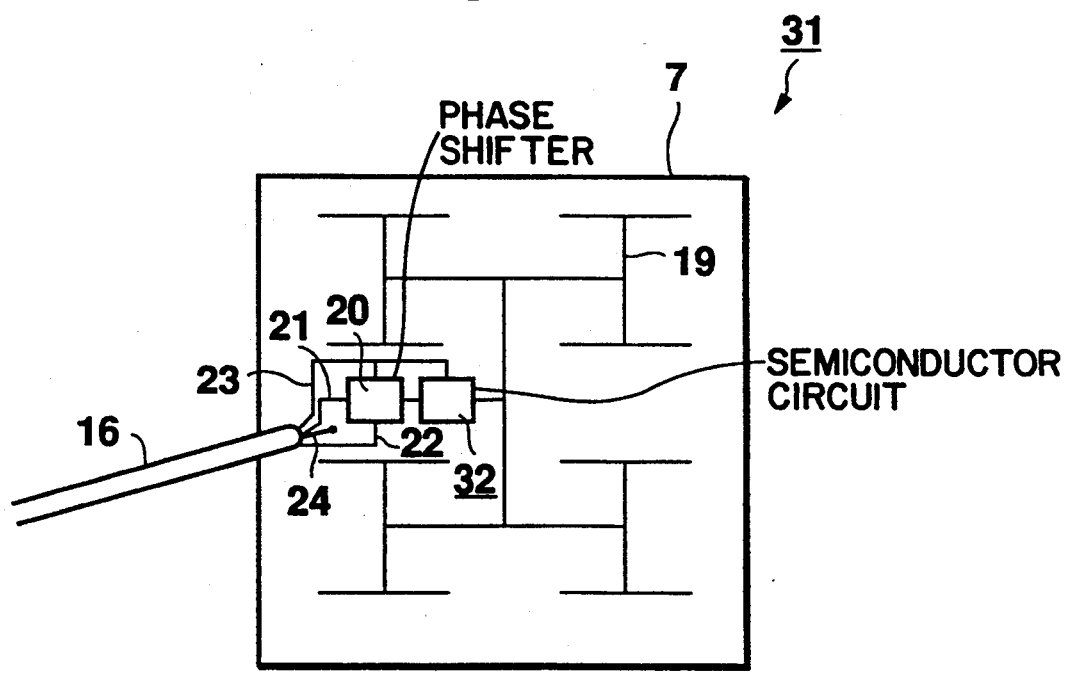
Figure 7:
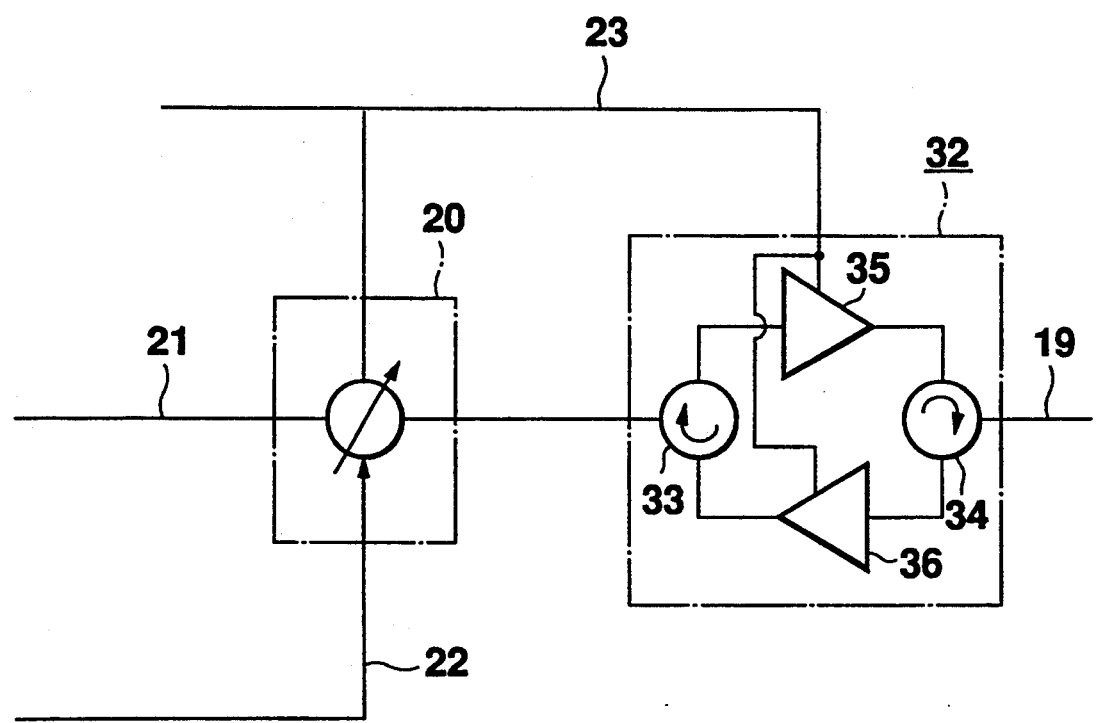
FIG. 7 is a circuit diagram of a structure of a semiconductor circuit of the third embodiment of the array antenna according to the present invention.

In FIGS. 6A, 6B and 7, there is shown the third embodiment of an array antenna according to the present invention. In particular, FIG. 5A illustrates the surface of each subarray of the array antenna, FIG. 5B illustrates the back of each subarray, and FIG. 7 illustrates a semiconductor circuit.

In this embodiment, each subarray 31 further includes a semiconductor circuit 32 in addition to the phase shifter 20 of the subarray 13 in the first embodiment shown in FIGS. 2A and 2B. In FIG. 6B, through the cable 16 used in the first embodiment is used for connecting the circuit within the spacecraft body 15 with each subarray 31, when the same extension method and structure as those of the second embodiment are adopted, the cable 30 used in the second embodiment can be employed in this embodiment.

As shown in FIG. 7, the semiconductor circuit 32 is comprised of two circulators 33 and 34 and two amplifiers 35 and 36. The circulator 33 is connected to the phase shifter 20 so as to supply the radio frequency signal output from the phase shifter 20 to the amplifier 35 in the transmission and to supply the radio frequency signal output from the amplifier 36 to the phase shifter 20 in the reception. Also, the circulator 34 is connected to the subarray feeder 19 so as to supply the radio frequency signal output from the amplifier 35 to the subarray feeder 19 in the transmitting and to supply the radio frequency signal output from the subarray feeder 19 to the amplifier 36 in the reception. The amplifier 35 is a power amplifier for the transmission and the amplifier 36 is a low-noise amplifier for the reception. The electric power is also supplied to the semiconductor circuit 32 via the power supply cable 23.

Therefore, in this embodiment, the array antenna can be used in common for the transmission and the reception. In this embodiment, of course, the same effects as those of the first and the second embodiments described above can be also obtained.

The Fourth Embodiment

Figure 8:
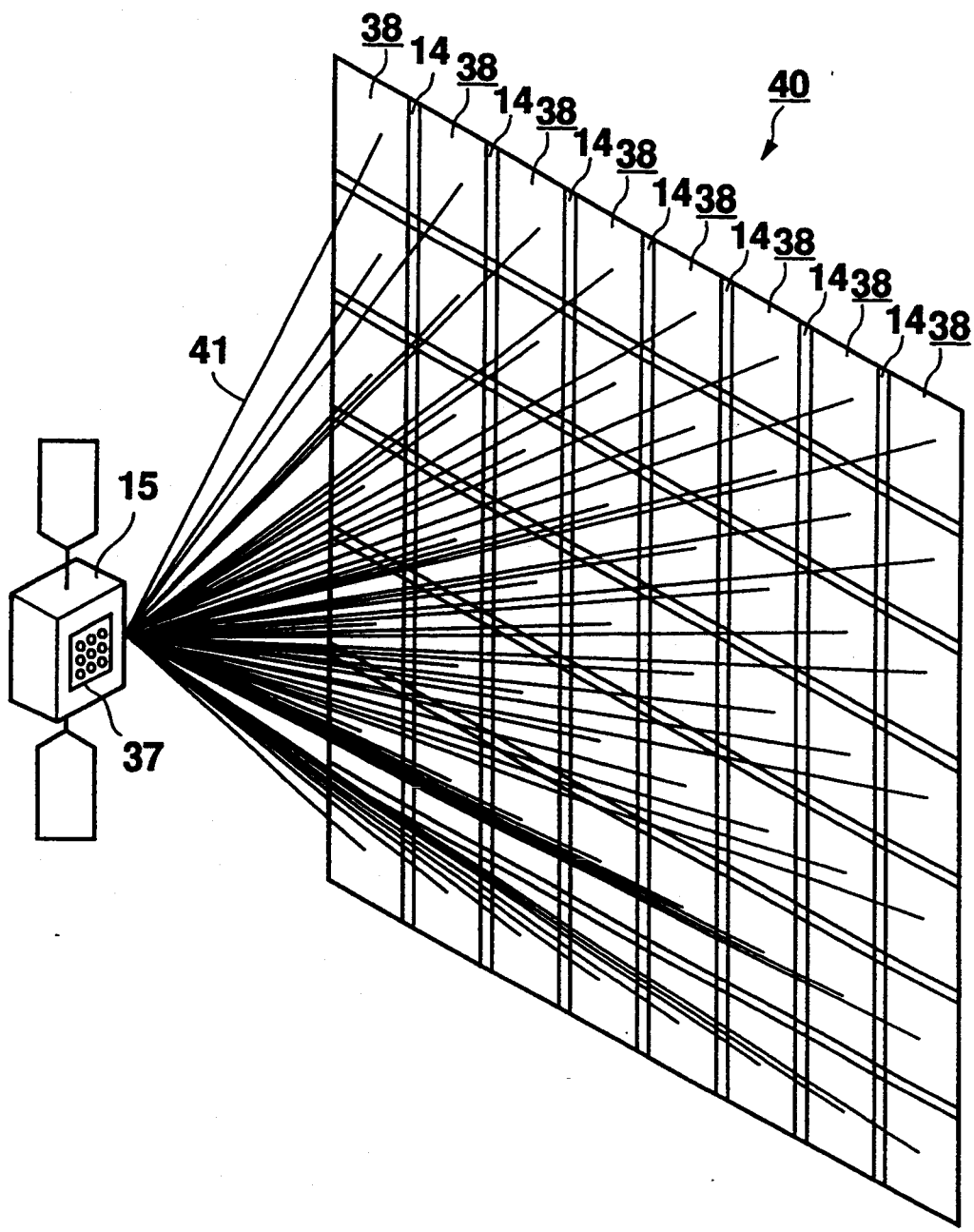
FIG. 8 is a perspective view showing an extended state of a fourth embodiment of an array antenna according to the present invention.
Figure 9A:
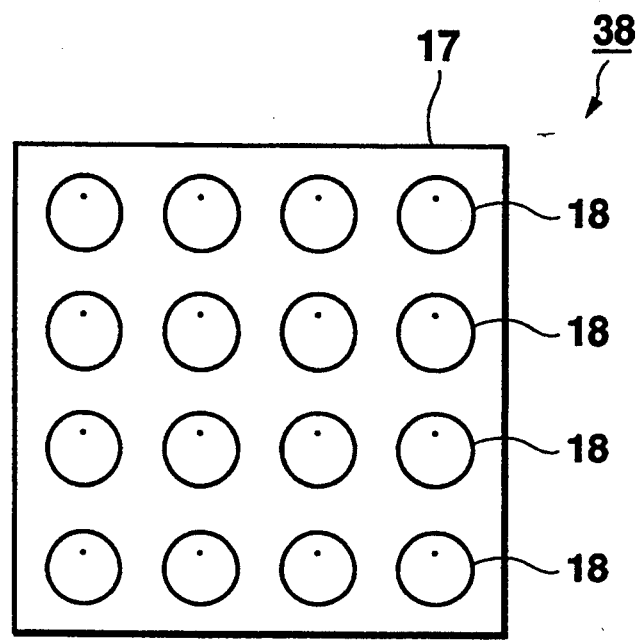
FIG. 9A is a plan view showing an arrangement of antenna elements on the surface of a subarray of the array antenna shown in FIG. 8
Figure 9B:
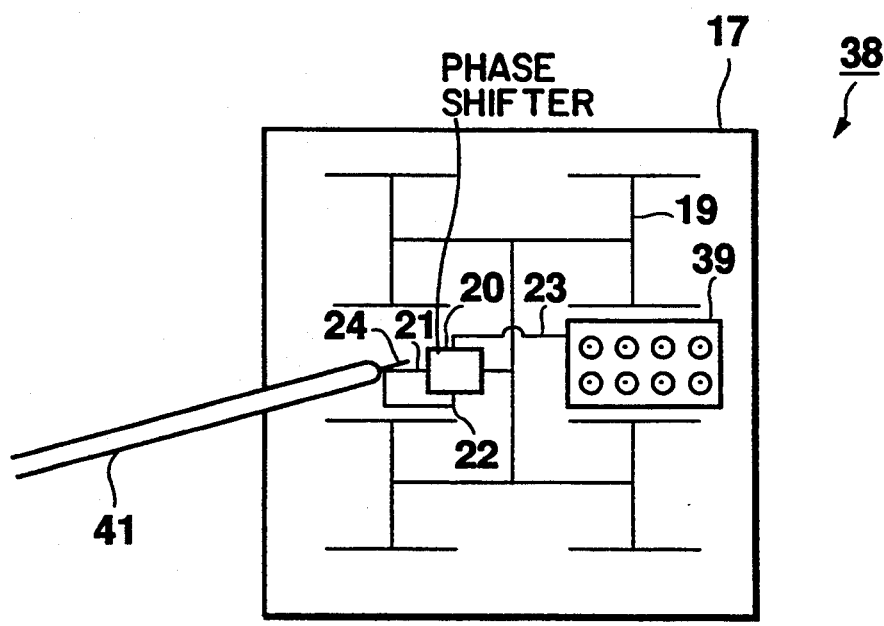
FIG. 9B is a plan view of an arrangement of a feeding system on the back of the subarray of the same.

In FIGS. 8, 9A and 9B, there is shown the fourth embodiment of an array antenna according to the present invention. In particular, FIG. 8 illustrates the extended state of the array antenna, FIG. 9A illustrates the surface of each subarray of the array antenna, and FIG. 9B illustrates the back of each subarray.

In this embodiment, as shown in FIG. 8, first, the spacecraft body 15 is also provided with an antenna 37 for a microwave transmission. Also, a rectenna 39 for a microwave reception for converting a received radio frequency signal into a DC voltage is mounted on the back (the surface on the spacecraft body side) of the support 17 of each subarray 38, as shown in FIG. 9B. In FIG. 8, the array antenna 40 includes 8×7=56 number (generally, a plurality number) of subarrays 38, and by a cable 41, each subarray 38 is supported and is electrically connected to the spacecraft body 15.

As shown in FIG. 9B, the cable 41 is the same as the cable 16 used in the first and the third embodiments except that the power supply cable 23 is omitted. In this embodiment, the power supply cable 23 couples the phase shifter 20 with the rectenna 39 for the microwave reception.

Hence, in this embodiment, the electric power is supplied to the phase shifter 20 by not the cable but the radio transmission between the antenna 37 for the microwave transmission and the rectenna 39 for the microwave reception. Thus, the cable 41 is not required to include the power supply cable 23. In this embodiment, the same effects as those of the first embodiment can be also obtained.

The Fifth Embodiment

Figure 10A:
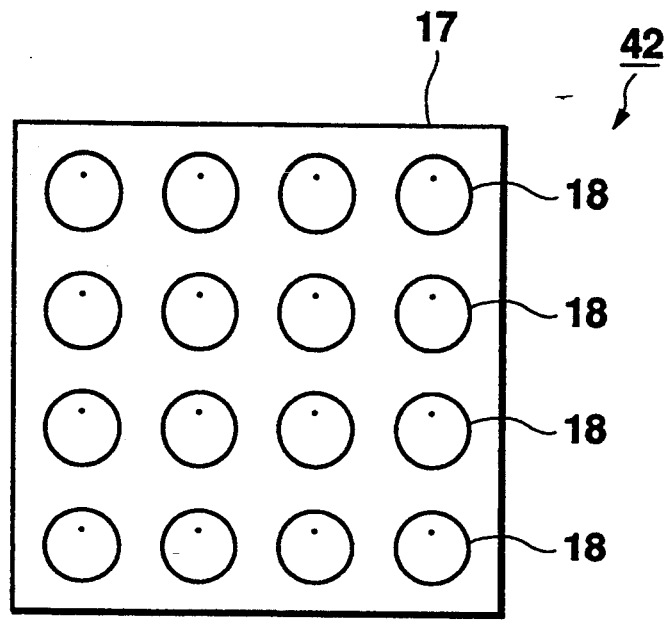
FIG. 10A is a plan view showing an arrangement of antenna elements on the surface of a subarray of a fifth embodiment of an array antenna according to the present invention and FIG. 10B is a plan view of an arrangement of a feeding system on the back of the subarray of the same.
Figure 10B:
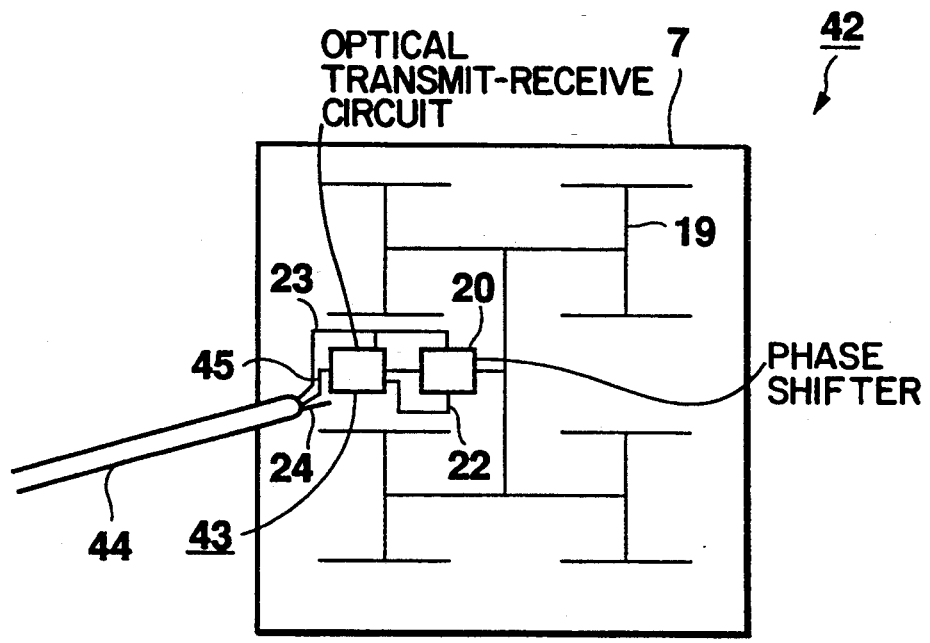
Figure 11:
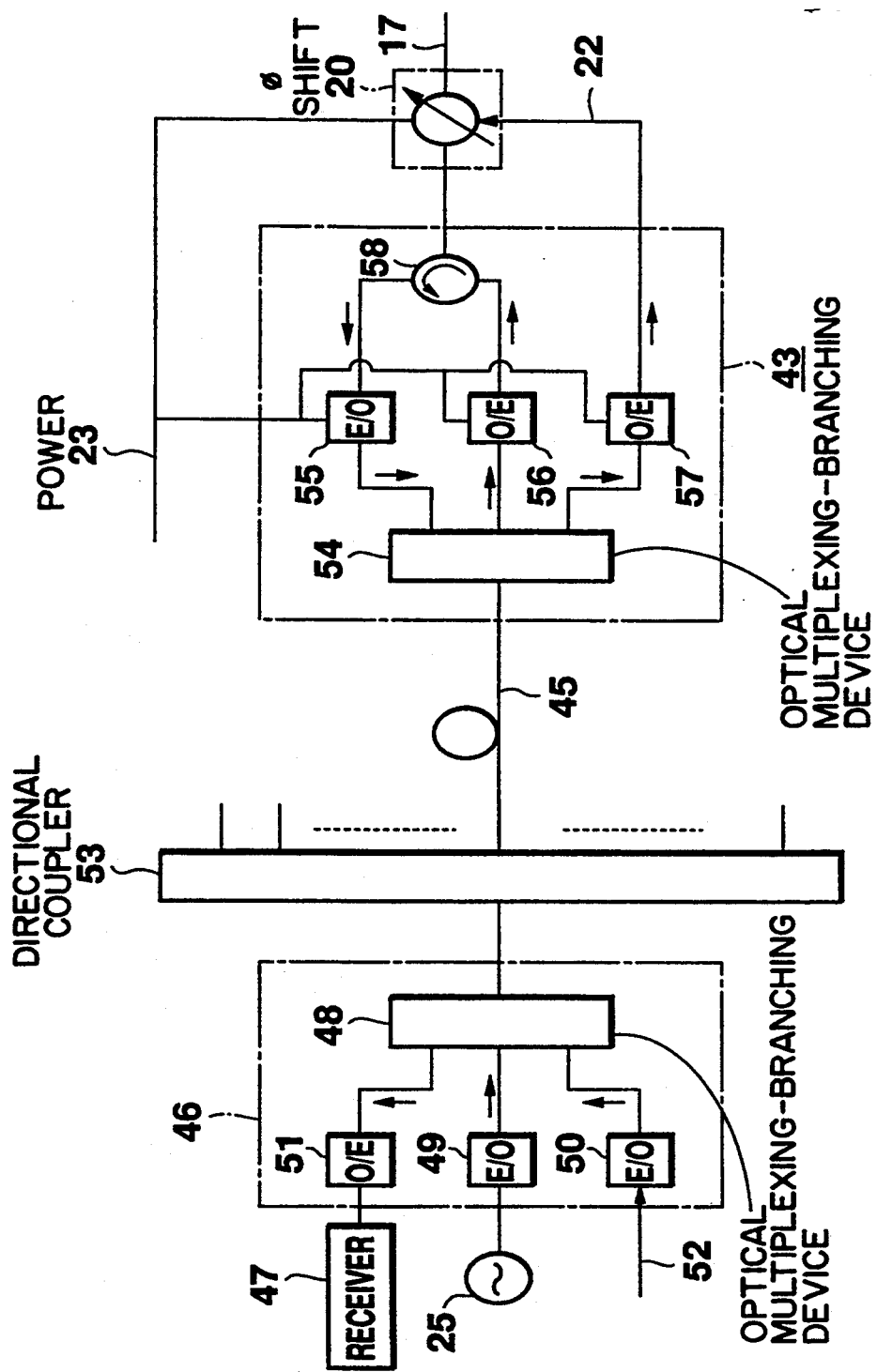
FIG. 11 is a circuit diagram of a circuit structure of a feeding system of the fifth embodiment of the array antenna according to the present invention.

In FIGS. 10A, 10B and 11, there is shown the fifth embodiment of an array antenna according to the present invention. In particular, FIG. 10A illustrates the surface of each subarray of the array antenna, FIG. 10B illustrates the back of each subarray, and FIG. 11 illustrates a circuit of the array antenna.

In this embodiment, 4×4 antenna elements 18 are mounted on the surface of the support 17 of each subarray 42. As shown in FIG. 10B, each subarray 42 is provided with an optical transmit-receive circuit 43. A cable 44 for connecting the spacecraft body 15 to each subarray 42 is constituted by a bundle of the power supply cable 23, the subarray support wire 24 and an optical fiber 45. In other words, in this case, the optical fiber 45 is used in place of the RF signal feeding cable 21 used in the first embodiment. The control signal wire 22 is used between the phase shifter 20 and the optical transmit-receive circuit 43 on the subarray 42. In the transmitting, the optical transmit-receive circuit 43 converts optical signals transmitted via the optical fiber 45 into electric signals (the radio frequency signal and the control signal) to supply the electric signals to the phase shifter 20. In the receiving, the optical transmit-receive circuit 43 converts the output of the phase shifter 20 into the optical signals to output the optical signals to the optical fiber 45.

In FIG. 11, there are shown the optical transmit-receive circuit 43 mounted on each subarray 42 and another optical transmit-receive circuit 46 mounted on the spacecraft body 15.

First, the optical transmit-receive circuit 46 is connected to a transmitter 25 and a receiver 47 mounted on the spacecraft body 15 and is comprised of an optical multiplexing-branching device 48, two electrooptic transducers 49 and 50 and an optoelectric transducer 51.

The radio frequency signal output from the transmitter 25 is converted into the optical signal in the electrooptic transducer 49 to supply the optical signal to the optical multiplexing-branching device 48. Also, a signal is input to the optical transmit/receive circuit 46 via a signal line 52 and is converted into the optical signal in the electrooptic transducer 50 to supply the optical signal to the optical multiplexing-branching device 48. The signal line 52 transmits the signal output from a circuit (not shown) mounted on the spacecraft body 15. The optical multiplexing-branching device 48 optically multiplexes the optical signals output from the electrooptic transducers 49 and 50 to output optical signals to a directional coupler 53 mounted on the spacecraft body 15. The directional coupler 53 distributes the optical signals output from the optical multiplexing-branching device 48 to the optical fibers 45 connected to the subarrays 42.

The directional coupler 53 also synthesizes the optical signals supplied from the subarrays 42 via the optical fibers 45 to supply the synthesized optical signals to the optical multiplexing-branching device 48. The optical multiplexing-branching device 48 supplies the optical signals output from the directional coupler 53 to the optoelectric transducer 51. The optoelectric transducer 51 converts the optical signals into the electric signals to supply the electric signals to the receiver 47.

On the other hand, the optical transmit/receive circuit 43 is comprised of an optical multiplexing-branching device 54, an electrooptic transducer 55, two optoelectric transducers 56 and 57 and a circulator 58.

The optical signal supplied From the spacecraft body side via the optical fiber 45 is supplied to the optoelectric transducers 56 and 57. At this time, a component corresponding to the output of the transmitter 25 and a component corresponding to the signal transmitted from the signal line 52 are distributed to the optoelectric transducer 56 and the optoelectric transducer 57, respectively. The optoelectric transducer 56 receives the power supply via the power supply cable 23 and converts the optical signal output from the optical multiplexing-branching device 54 into the electric signal (radio frequency signal) to supply the electric signal to the circulator 58. Also, the optoelectric transducer 57 receives the power supply via the power supply cable 23 and converts the optical signal output from the optical multiplexing-branching device 54 into the electric signal (control signal) to supply the electric signal as the control signal to the phase shifter 20.

The radio frequency signal supplied from the antenna element 18 via the phase shifter 20 is supplied to the electrooptic transducer 55 via the circulator 58. That is, the circulator 58 is connected to the phase shifter 20 so as to supply the output of the optoelectric transducer 56 to the phase shifter 20 and to supply the output of the phase shifter 20 to the electrooptic transducer 55. The electrooptic transducer 55 converts the radio frequency signal into the optical signal to supply the optical signal to the optical multiplexing-branching device 54. The optical multiplexing-branching device 54 sends out the optical signal onto the optical fiber 45.

Hence, in this embodiment, the same effects as those of the first embodiment can be obtained. In addition, because of the use of the optical transmission, the radio frequency signals can be protected from noises or the like and further a large capacity of information can be transmitted.

The Sixth Embodiment

Figure 12:
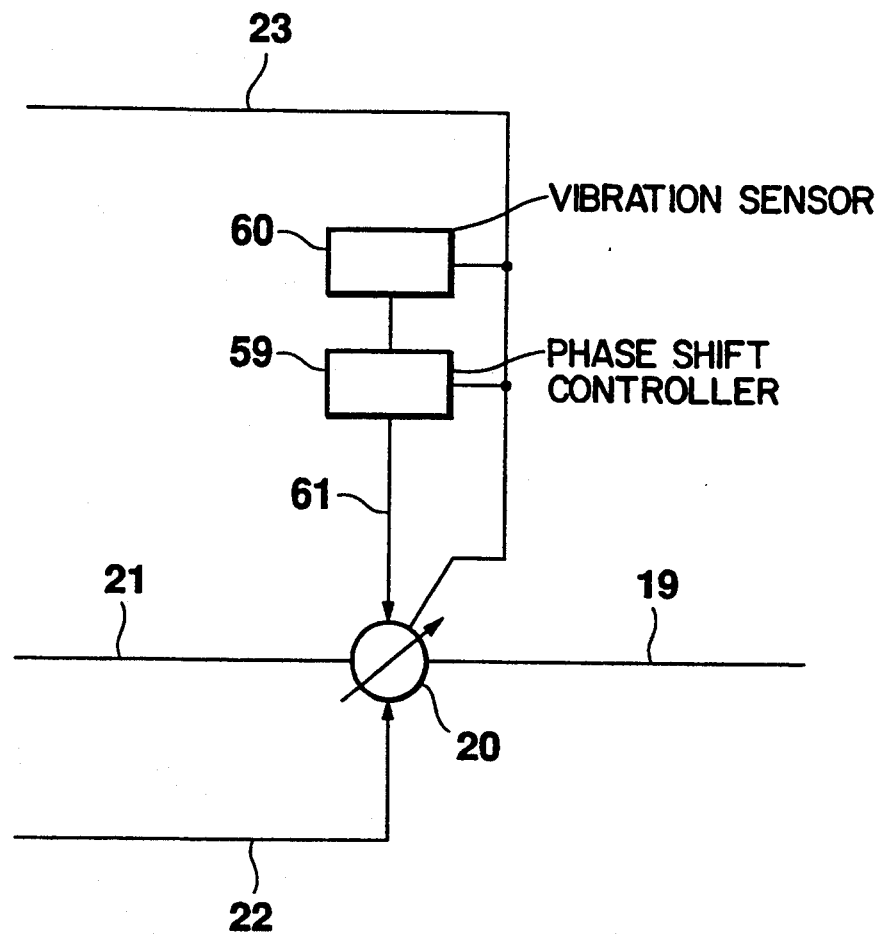
FIG. 12 is a circuit diagram of a circuit structure of a feeding system on the back of a subarray of a sixth embodiment of an array antenna according to the present invention.

FIG. 12 illustrates a circuit structure of a feeding system on the back of each subarray of the sixth embodiment of an array antenna according to the present invention. The other members of the array antenna are the same as those of the first embodiment and thus the description thereof can be omitted for brevity.

In this embodiment, each subarray further includes a phase shifter controller 59 and a vibration sensor 60 in addition to the circuit of the first embodiment. The vibration sensor 60 detects a change of an attitude of the subarray as a vibration, and the phase shifter controller 59 generates a control signal depending on the detected change of the attitude of the subarray. The generated control signal is supplied to the phase shifter 20 via a control signal line 61 along with the control signal supplied from the spacecraft body 15 via the control signal wire 22. Hence, in this embodiment, in addition to the same effects as those of the first embodiment, an effect of an automatic adjustment of a phase shift amount depending on the change of the attitude of the subarray can be obtained. In this case, the electric power for the phase shifter controller 59 and the vibration sensor 60 can be supplied via the power supply cable 23.

The Seventh Embodiment

Figure 13:
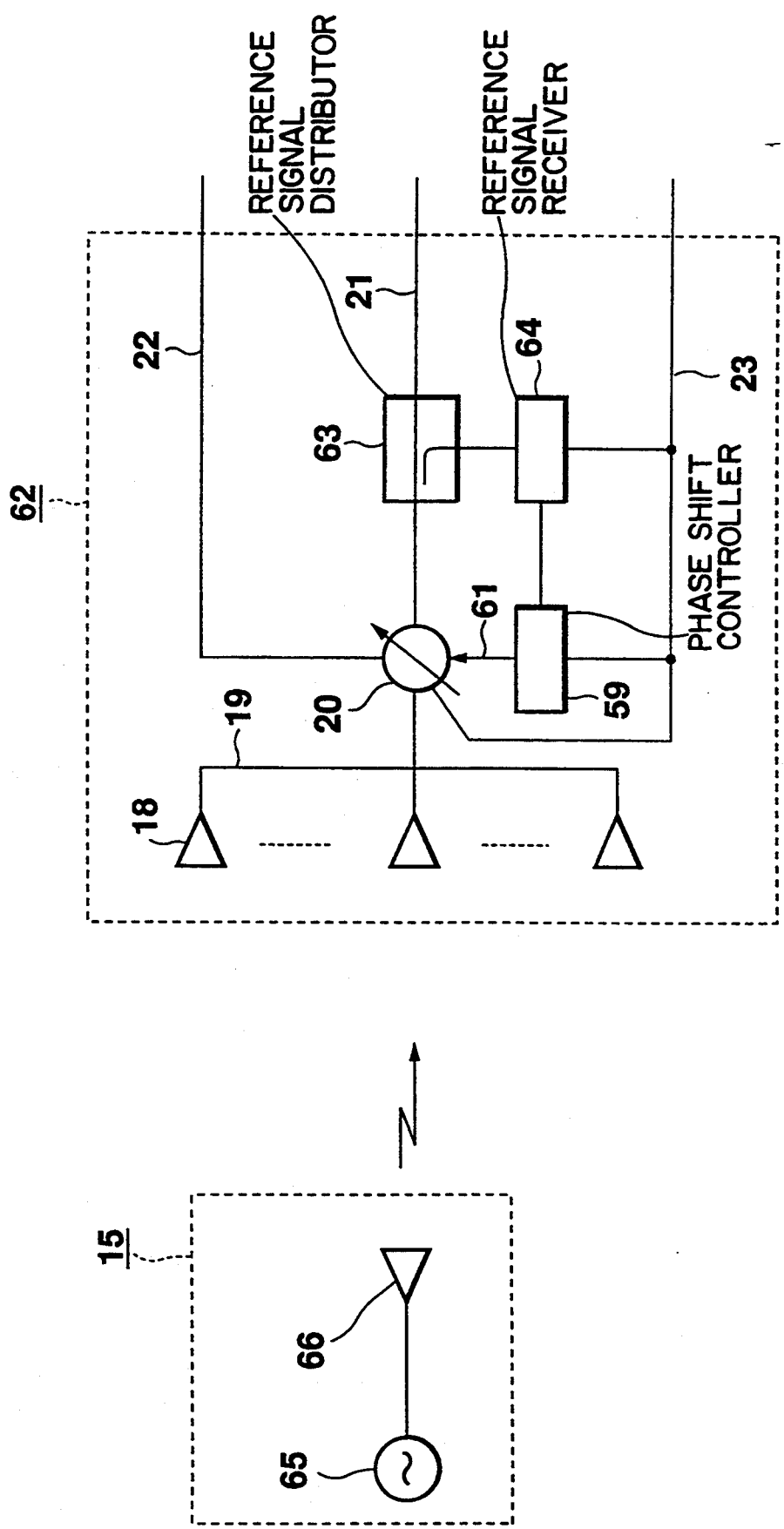
FIG. 13 is a circuit diagram of a circuit structure of a feeding system of a seventh embodiment of an array antenna according to the present invention.
Figure 14:
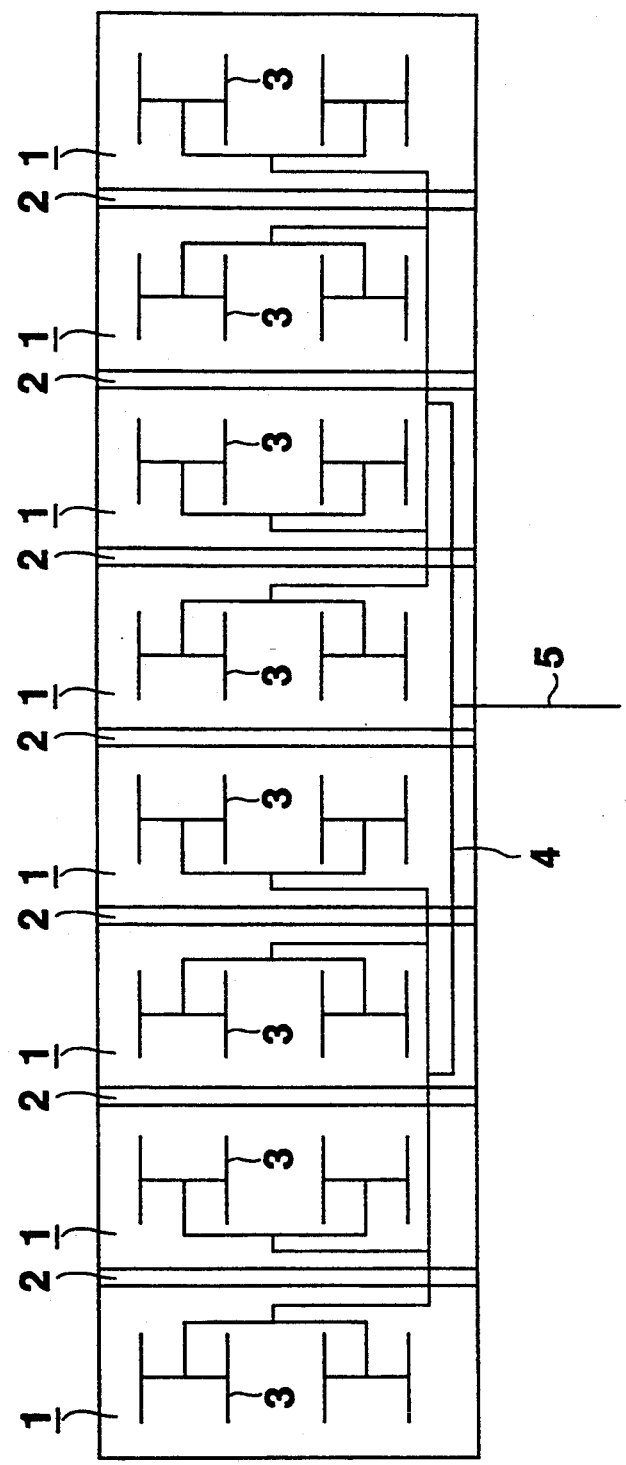
FIG. 14 is a plan view of a feeder arrangement in an extended state of a conventional array antenna.
Figure 16:
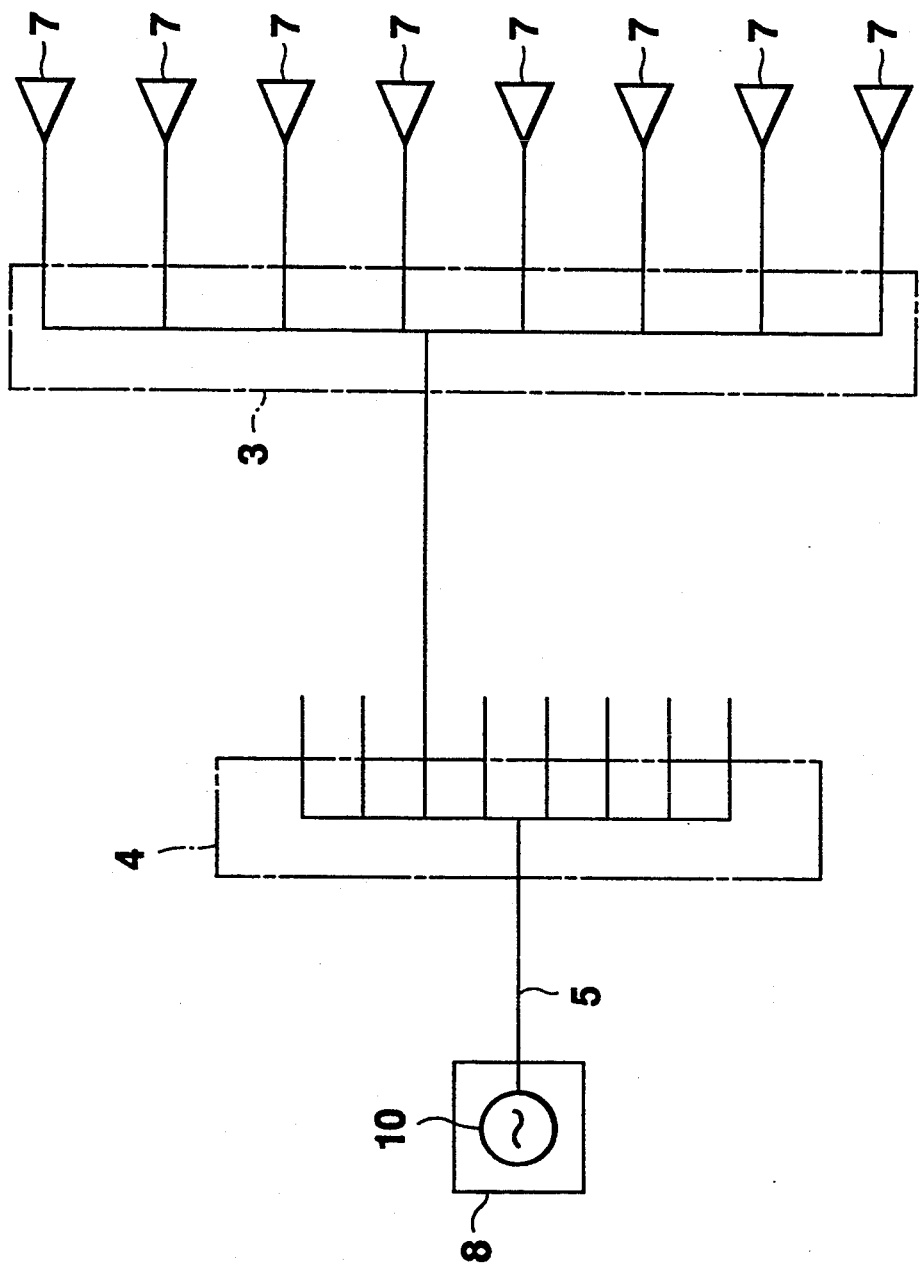
FIG. 16 is a circuit diagram of a circuit structure of the feeding system of the array antenna shown in FIG. 14.
Figure 17A:
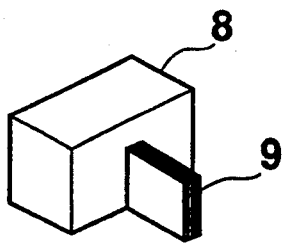
FIG. 17A to 17C are perspective views showing a satellite launching sequence.
Figure 17B:
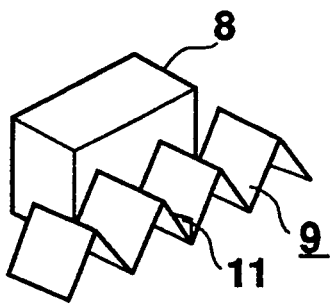
Figure 17C:
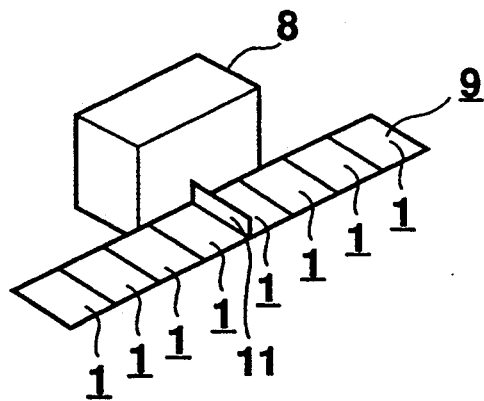

FIG. 13 illustrates a circuit structure of a feeding system of each subarray and an internal circuit of a spacecraft body in the seventh embodiment of an array antenna according to the present invention. The other members of the array antenna are the same as those of the first embodiment and thus the description thereof can be omitted for brevity.

In this embodiment, each subarray 62 further includes a phase shifter controller 59, a reference signal distributor 63, and a reference signal receiver 64 in addition to the members of each subarray 13 of the first embodiment. The reference signal distributor 63 is arranged between the RF signal feeding cable 21 and the phase shifter 20, and the reference signal receiver 64 receives a distribution of a signal from the reference signal distributor 63. The phase shifter controller 59 controls a phase shift amount and the like of the phase shifter 20 on the basis of the output of the reference signal receiver 64. Also, the reference signal receiver 64 and the phase shifter controller 59 receive the power supply via the power supply cable 23. On the spacecraft body 15, a reference signal source 65 and a reference signal transmission antenna 66 are mounted. The reference signal transmission antenna 66 transmits a reference signal generated by the reference signal source 65 toward the subarray 62. The signal transmitted from the reference signal transmission antenna 66 is received by the antenna elements 18.

In this embodiment, the attitude variation of the subarray 62 is detected as the phase variation of the reference signal. That is, when the attitude of the subarray 62 is changed, the phase of the reference signal received by the antenna elements 18 changes. The reference signal receiver 64 detects this phase variation from the reference signal distributed from the reference signal distributor 63. The phase shifter controller 59 corrects the phase shift amount of the phase shifter 20 on the basis of the output of the reference signal receiver 64.

Accordingly, in this embodiment, in addition to the same effects as those of the first embodiment, an effect of an automatic adjustment of the phase shift amount depending on the attitude variation of the subarray can be obtained.

According to the present invention, as described above, although the first, the second, the fourth, the sixth and the seventh embodiments have been described with respect to only the transmission, it is apparent for those skilled in the art to apply the present invention to the reception from the description of the specification including the other embodiments and the disclosure of the accompanying drawings.

Also, as to the mechanism and the construction of the joint parts 14, any of a variety of means well-known to those skilled in the art can be used. Concerning the antenna elements 18, any of well-known types such as a microstrip antenna, a dipole antenna, a horn antenna and the like can be used. The phase shifter 20 can be provided between the subarray feeder 19 and the antenna elements 18. The phase shifter 20 can be mounted on the spacecraft body 15. In place of the circulator, a diplexer or the like can be employed. The constructions of the antenna 37 for the microwave transmission and the rectenna 39 for the microwave reception can be produced by a diversion or an application of a well-known construction. The constructions of the optoelectric transducer, the electrooptic transducer, the optical multiplexing-branching device and the directional coupler can be produced by a diversion or an application of a well-known construction. In place of the vibration sensor 60, an optical fiber gyro or the like can be used. The reference signal source 65, the reference signal transmission antenna 66, the reference signal distributor 63 and the reference signal receiver 64 can be constructed by applying conventional well-known circuits. The attitude variation detecting method by the phase shift variation detection can be readily understood from the above description by a person skilled in the art. The reference signal receiver 64 can be used in common with the receiver 47. It is unnecessary to mount the reference signal source 65 and the reference signal receiver 64 on the spacecraft body 15, and these can be mounted on one or a plurality of subarrays 62 or can be provided on the ground or another spacecraft.

Further, the extended shape of the array antenna is not restricted to the flat plate form. That is, the present invention includes a construction of an array antenna to be extended on a curved surface.

Also, of course, the above-described embodiments can be properly combined.

While the present invention has been described with reference to the particular illustrative embodiments, it is not to be restricted by those embodiments but only by the appended claims. It is to be appreciated that those skilled in the are can change or modify the embodiments without departing from the scope and spirit of the present invention.

What is claimed is:

1. An array antenna mounted on a spacecraft, having a stowed state before launching of the spacecraft, the array antenna including a plurality of subarrays, comprising:
    a joint mechanism for jointing the subarrays;
    connection means for electrically connecting each subarray to the spacecraft;
    an electric circuit for selecting one of a shape and direction of a directivity beam;
    a support mechanism for supporting each subarray onto the spacecraft;
    an antenna extension mechanism for extending the array antenna to a predetermined form after launching the spacecraft;
    wherein the electric circuit includes;
    a variable phase shifter, whose operation is controlled by a control signal, for carrying out a phase shift of a supplied radio frequency signal;
    means for detecting a directional position variation of each subarray;
    means for generating the control signal depending on the directional position variation; and
    wherein the directional position variation detecting means includes a vibration sensor for detecting a vibration of the corresponding subarray.

2. The array antenna of claim 1, wherein the support mechanism includes a plurality of connection cables, extending at an angle from each subarray, for connecting the subarrays onto the spacecraft while the array antenna is extended.

3. The array antenna of claim 2, wherein each connection cable includes a support wire for ensuring a connection strength between the corresponding subarray and the spacecraft.

4. The array antenna of claim 2, wherein the connection means includes a feeding line included in each connection cable, for feeding to the corresponding subarray.

5. The array antenna of claim 4, wherein the electric circuit includes a variable phase shifter mounted to each subarray, and
    the connection means includes:
    a control signal line included in each connection cable, for transmitting a control signal to control an operation of the corresponding variable phase shifter; and
    a power supply line included in each connection cable, for supplying an electric power to the corresponding variable phase shifter.

6. The array antenna of claim 1, wherein at least one point of the array antenna is mounted to the spacecraft, and wherein the antenna extension mechanism includes an extension pole mounted to the spacecraft and the extension pole extends to a predetermined direction after launching the spacecraft to extend the array antenna to the predetermined form.

7. The array antenna of claim 6, wherein the array antenna is folded into both side directions of a rectangular form of the array antenna before launching the spacecraft.

8. The array antenna of claim 1, wherein each subarray includes:
    a plurality of antenna elements; and
    a feeder path for feeding to each antenna element.

9. The array antenna of claim 8, wherein each subarray further includes a support with a surface and a back surface for supporting the antenna elements and the feeder path.

10. The array antenna of claim 9, wherein the antenna elements are formed on one surface and the feeder path is formed on another surface.

11. The array antenna of claim 8, wherein the electric circuit includes a variable phase shifter which is mounted on each subarray and is arranged on the feeder path.

12. The array antenna of claim 11, wherein the connection means includes a power supply line for feeding to each variable phase shifter via the feeder path.

13. The array antenna of claim 11, wherein the connection means includes a power supply line for supplying an electric power to each variable phase shifter.

14. The array antenna of claim 11, wherein the connection means includes a control signal line for transmitting a control signal for controlling an operation of each variable phase shifter.

15. The array antenna of claim 1, further comprising means for selecting one of transmission and reception functions of each subarray.

16. The array antenna of claim 15, wherein each subarray includes a plurality of antenna elements, and the selecting means includes:
- a first amplifier for amplifying a first signal to be transmitted to the corresponding subarray;
- a second amplifier for amplifying a second signal received by the corresponding subarray; and
- an element for selecting one of a first signal path from the spacecraft to the antenna element via the first amplifier and a second signal path from the antenna element to the spacecraft via the second amplifier.

17. The array antenna of claim 1, wherein the connection means includes:
- a first antenna for transmitting an electric power in a form of a radio frequency signal from the spacecraft to each subarray; and
- a second antenna for receiving and converting the transmitted radio frequency signal into a form of a direct current voltage.

18. The array antenna of claim 1, wherein each subarray includes a plurality of antenna elements; and
the connection means includes:
- first means mounted on the spacecraft for generating an electric signal;
- second means mounted on the spacecraft for converting the electric signal into an optical signal;
- an optical fiber provided between the spacecraft and each subarray for transmitting the optical signal;
- third means mounted on each subarray for converting the optical signal transmitted by the optical fiber into the electric signal; and
- fourth means mounted on each subarray for supplying the electric signal obtained by the third means as a signal to be transmitted to the antenna elements.

19. The array antenna of claim 1, wherein each subarray includes a plurality of antenna elements; and
the connection means includes:
- first means, mounted on each subarray, for converting an electric signal received by the antenna element into an optical signal;
- an optical fiber provided between the spacecraft and each subarray for transmitting the optical signal;
- second means, mounted on the spacecraft, for converting the optical signal transmitted by the optical fiber into the electric signal; and
- third means, mounted on the spacecraft, for receiving the electric signal converted by the second means, as a signal to be received by the antenna elements and for processing the electrical signal.

20. The array antenna of claim 1, wherein the electric circuit includes a variable phase shifter which is mounted on each subarray and whose operation is controlled by a control signal, for carrying out a phase shift of a supplied radio frequency signal, and
wherein the connection means includes:
- first means, mounted on the spacecraft, for generating a transmission signal;
- second means, mounted on the spacecraft, for multiplexing the control signal supplied to the variable phase shifter and the transmission signal to obtain an electric signal, and for converting the electric signal into an optical signal;
- an optical fiber provided between the spacecraft and each subarray for transmitting the optical signal;
- third means, mounted on each subarray, for converting the optical signal into the electric signal; and
- fourth means, mounted on each subarray, for demultiplexing the electrical signal, to obtain both the control signal supplied to the variable phase shifter, and the transmission signal.

21. An array antenna mounted on a spacecraft, having a stowed state before launching of the spacecraft, the array antenna including a plurality of subarrays, comprising:
- a joint mechanism for jointing the subarrays;
- connection means for electrically connecting each subarray to the spacecraft;
- an electric circuit for selecting one of a shape and direction of a directivity beam;
- a support mechanism for supporting each subarray onto the spacecraft;
- an antenna extension mechanism for extending the array antenna to a predetermined form after launching the spacecraft;
wherein the electric circuit includes;
- a variable phase shifter, whose operation is controlled by a control signal, for carrying out a phase shift of a supplied radio frequency signal;
- means for detecting a directional position variation of each subarray;
- means for generating the control signal depending on the directional position variation; and
wherein the directional position variation detecting means includes:
- means for transmitting a reference signal having a predetermined phase to each subarray;
- means, mounted on each subarray, for receiving the reference signal;
- phase variation detecting means, for detecting a phase variation of the reference signal received, and for supplying a detected phase variation signal to the control signal generating means, and
wherein the control signal generating means generates the control signal depending on the detected phase variation signal supplied from the phase variation detecting means.

22. The array antenna of claim 1, wherein the antenna extension mechanism extends the array antenna to a flat plate form.

23. The array antenna of claim 21, wherein the joint mechanism includes a plurality of plate springs for jointing the adjacent subarrays.

24. A spacecraft comprising:
- a spacecraft body; and
- an array antenna to be mounted on the spacecraft body, the array antenna having a stowed state before launching the spacecraft and including a plurality of subarrays,
the array antenna including:
  - a joint mechanism for jointing the subarrays;
  - connection means for electrically connecting each subarray to the spacecraft;
  - an electric circuit for selecting one of a shape and a direction of a directivity beam;
  - a support mechanism for supporting each subarray onto the spacecraft;
  - an antenna extension mechanism for extending the array antenna to a predetermined form after launching the spacecraft;
wherein the electric circuit includes;
- a variable phase shifter, whose operation is controlled by a control signal, for carrying out a phase shift of a supplied radio frequency signal;

means for detecting a directional position variation of each subarray;
means for generating the control signal depending on the directional position variation; and
wherein the directional position variation detecting means includes a vibration sensor for detecting a vibration of the corresponding subarray.

25. The spacecraft of claim 24, wherein the support mechanism includes a plurality of connection cables, extending at an angle from each subarray, for connecting the subarrays onto the spacecraft while the array antenna is extended.

26. The spacecraft of claim 24, wherein at least one point of the array antenna is mounted to the spacecraft, and wherein the antenna extension mechanism includes an extension pole mounted to the spacecraft and the extension pole extends to a predetermined direction after launching the spacecraft to extend the array antenna to the predetermined form.

27. The spacecraft of claim 24, further comprising means for selecting one of transmission and reception functions of each subarray.

28. The spacecraft of claim 24, wherein the connection means includes:
a first antenna for transmitting an electric power in a form of a radio frequency signal from the spacecraft to each subarray; and
a second antenna for receiving and converting the transmitted radio frequency signal into a form of a direct current voltage.

29. The spacecraft of claim 24, wherein the electric circuit includes a variable phase shifter which is mounted on each subarray and whose operation is controlled by a control signal, for carrying out a phase shift of a supplied radio frequency signal, and
wherein the connection means includes:
first means, mounted on the spacecraft, for generating a transmission signal;
second means, mounted on the spacecraft, for multiplexing the control signal supplied to the variable phase shifter and the transmission signal to obtain an electric signal, and for converting the electric signal into an optical signal;
an optical fiber provided between the spacecraft and each subarray for transmitting the optical signal;
third means, mounted on each subarray, for converting the optical signal into the electric signal; and
fourth means, mounted on each subarray, for demultiplexing the electrical signal, to obtain both the control signal supplied to the variable phase shifter, and the transmission signal.

30. A spacecraft comprising:
a spacecraft body; and
an array antenna to be mounted on the spacecraft body, the array antenna having a stowed state before launching the spacecraft and including a plurality of subarrays,
the array antenna including:
a joint mechanism for jointing the subarrays;
connection means for electrically connecting each subarray to the spacecraft;
an electric circuit for selecting one of a shape and a direction of a directivity beam;
a support mechanism for supporting each subarray onto the spacecraft;
an antenna extension mechanism for extending the array antenna to a predetermined form after launching the spacecraft;
wherein the electric circuit includes;
a variable phase shifter, whose operation is controlled by a control signal, for carrying out a phase shift of a supplied radio frequency signal;
means for detecting a directional position variation of each subarray;
means for generating the control signal depending on the directional position variation; and
wherein the directional position variation detecting means includes;
means for transmitting a reference signal having a predetermined phase to each subarray;
means, mounted on each subarray, for receiving the reference signal;
phase variation detecting means, for detecting a phase variation of the reference signal received, and for supplying a detected phase variation signal to the control signal generating means, and
wherein the control signal generating means generates the control signal depending on the detected phase variation signal supplied from the phase variation detecting means.

31. The spacecraft of claim 30 wherein the support mechanism includes a plurality of connection cables, extending at an angle from each subarray, for connecting the subarrays onto the spacecraft while the array antenna is extended.

32. The spacecraft of claim 30, wherein at least one point of the array antenna is mounted to the spacecraft, and wherein the antenna extension mechanism includes an extension pole mounted to the spacecraft and the extension pole extends to a predetermined direction after launching the spacecraft to extend the array antenna to the predetermined form.

33. The spacecraft of claim 30, further comprising means for selecting one of transmission and reception functions of each subarray.

34. The spacecraft of claim 30, wherein the connection means includes:
a first antenna for transmitting an electric power in a form of a radio frequency signal from the spacecraft to each subarray; and
a second antenna for receiving and converting the transmitted radio frequency signal into a form of a direct current voltage.

35. The spacecraft of claim 30, wherein the electric circuit includes a variable phase shifter which is mounted on each subarray and whose operation is controlled by a control signal, for carrying out a phase shift of a supplied radio frequency signal, and
wherein the connection means includes:
first means, mounted on the spacecraft, for generating a transmission signal;
second means, mounted on the spacecraft, for multiplexing the control signal supplied to the variable phase shifter and the transmission signal to obtain an electric signal, and for converting the electric signal into an optical signal;
an optical fiber provided between the spacecraft and each subarray for transmitting the optical signal;
third means, mounted on each subarray, for converting the optical signal into the electric signal; and
fourth means, mounted on each subarray, for demultiplexing the electrical signal, to obtain both the control signal supplied to the variable phase shifter, and the transmission signal.

36. The array antenna of claim 21, wherein the support mechanism includes a plurality of connection cables, extending at an angle from each subarray, for connecting the subarrays onto the spacecraft while the array antenna is extended.

37. The array antenna of claim 36, wherein each connection cable includes a support wire for ensuring a connection strength between the corresponding subarray and the spacecraft.

38. The array antenna of claim 36, wherein the connection means includes a feeding line included in each connection cable, for feeding to the corresponding subarray.

39. The array antenna of claim 38, wherein the electric circuit includes a variable phase shifter mounted to each subarray, and
the connection means includes:
a control signal line included in each connection cable, for transmitting a control signal to control an operation of the corresponding variable phase shifter; and
a power supply line included in each connection cable, for supplying an electric power to the corresponding variable phase shifter.

40. The array antenna of claim 21, wherein at least one point of the array antenna is mounted to the spacecraft, and wherein the antenna extension mechanism includes an extension pole mounted to the spacecraft and the extension pole extends to a predetermined direction after launching the spacecraft to extend the array antenna to the predetermined form.

41. The array antenna of claim 40, wherein the array antenna is folded into both side directions of a rectangular form of the array antenna before launching the spacecraft.

42. The array antenna of claim 21, wherein each subarray includes:
a plurality of antenna elements; and
a feeder path for feeding to each antenna element.

43. The array antenna of claim 42, wherein each subarray further includes a support with a surface and a back surface for supporting the antenna elements and the feeder path.

44. The array antenna of claim 43, wherein the antenna elements are formed on one surface and the feeder path is formed on another surface.

45. The array antenna of claim 42, wherein the electric circuit includes a variable phase shifter which is mounted on each subarray and is arranged on the feeder path.

46. The array antenna of claim 45, wherein the connection means includes a power supply line for feeding to each variable phase shifter via the feeder path.

47. The array antenna of claim 45, wherein the connection means includes a power supply line for supplying an electric power to each variable phase shifter.

48. The array antenna of claim 45, wherein the connection means includes a control signal line for transmitting a control signal for controlling an operation of each variable phase shifter.

49. The array antenna of claim 21, further comprising means for selecting one of transmission and reception functions of each subarray.

50. The array antenna of claim 49, wherein each subarray includes a plurality of antenna elements, and the selecting means includes:
a first amplifier for amplifying a first signal to be transmitted to the corresponding subarray;
a second amplifier for amplifying a second signal received by the corresponding subarray; and
an element for selecting one of a first signal path from the spacecraft to the antenna element via the first amplifier and a second signal path from the antenna element to the spacecraft via the second amplifier.

51. The array antenna of claim 21, wherein the connection means includes:
a first antenna for transmitting an electric power in a form of a radio frequency signal from the spacecraft to each subarray; and
a second antenna for receiving and converting the transmitted radio frequency signal into a form of a direct current voltage.

52. The array antenna of claim 21, wherein each subarray includes a plurality of antenna elements; and the connection means includes:
first means mounted on the spacecraft for generating an electric signal;
second means mounted on the spacecraft for converting the electric signal into an optical signal;
an optical fiber provided between the spacecraft and each subarray for transmitting the optical signal;
third means mounted on each subarray for converting the optical signal transmitted by the optical fiber into the electric signal; and
fourth means mounted on each subarray for supplying the electric signal obtained by the third means as a signal to be transmitted to the antenna elements.

53. The array antenna of claim 21, wherein each subarray includes a plurality of antenna elements; and the connection means includes:
first means, mounted on each subarray, for converting an electric signal received by the antenna element into an optical signal;
an optical fiber provided between the spacecraft and each subarray for transmitting the optical signal;
second means, mounted on the spacecraft, for converting the optical signal transmitted by the optical fiber into the electric signal; and
third means, mounted on the spacecraft, for receiving the electric signal converted by the second means, as a signal to be received by the antenna elements and for processing the electrical signal.

54. The array antenna of claim 21, wherein the electric circuit includes a variable phase shifter which is mounted on each subarray and whose operation is controlled by a control signal, for carrying out a phase shift of a supplied radio frequency signal, and
wherein the connection means includes:
first means, mounted on the spacecraft, for generating a transmission signal;
second means, mounted on the spacecraft, for multiplexing the control signal supplied to the variable phase shifter and the transmission signal to obtain an electric signal, and for converting the electric signal into an optical signal;
an optical fiber provided between the spacecraft and each subarray for transmitting the optical signal;
third means, mounted on each subarray, for converting the optical signal into the electric signal; and
fourth means, mounted on each subarray, for demultiplexing the electrical signal, to obtain both the control signal supplied to the variable phase shifter, and the transmission signal.

55. The array antenna of claim 21, wherein the antenna extension mechanism extends the array antenna to a flat plate form.

56. The array antenna of claim 21, wherein the joint mechanism includes a plurality of plate springs for jointing the adjacent subarrays.

* * * * *